(12) United States Patent
Spomer et al.

(10) Patent No.: US 12,171,211 B2
(45) Date of Patent: Dec. 24, 2024

(54) ADAPTIVE ACTIVE INFRARED SENSOR HARDWARE AND SOFTWARE IN THE DETECTION OF PESTS WITH PEST DETECTION STATION

(71) Applicant: Ecolab USA Inc., Saint Paul, MN (US)

(72) Inventors: Neil A. Spomer, Westfield, IN (US); Michael K. Hanson, Whitestown, IN (US); Douglas K. Brune, Carmel, IN (US); Nathaniel Welch, Appleton, WI (US); Edward G. Beistle, Appleton, WI (US); Richard V. Baxter, Appleton, WI (US); Jeffrey D Nagle, Noblesville, IN (US)

(73) Assignee: Ecolab USA Inc., Saint Paul, MN (US)

( * ) Notice: Subject to any disclaimer, the term of this patent is extended or adjusted under 35 U.S.C. 154(b) by 431 days.

(21) Appl. No.: 17/600,801

(22) PCT Filed: Apr. 2, 2020

(86) PCT No.: PCT/US2020/026343
§ 371 (c)(1),
(2) Date: Oct. 1, 2021

(87) PCT Pub. No.: WO2020/206089
PCT Pub. Date: Oct. 8, 2020

(65) Prior Publication Data
US 2022/0174928 A1 Jun. 9, 2022

Related U.S. Application Data

(60) Provisional application No. 62/927,807, filed on Oct. 30, 2019, provisional application No. 62/828,617, filed on Apr. 3, 2019.

(51) Int. Cl.
*A01M 1/00* (2006.01)
*A01M 1/02* (2006.01)
*G06Q 50/02* (2012.01)

(52) U.S. Cl.
CPC .............. *A01M 1/026* (2013.01); *G06Q 50/02* (2013.01); *A01M 2200/01* (2013.01)

(58) Field of Classification Search
CPC ..... A01M 1/026; A01M 1/02; A01M 2200/01
See application file for complete search history.

(56) References Cited

U.S. PATENT DOCUMENTS 6,445,301 B1 9/2002 Farrell et al.
7,401,436 B2 7/2008 Chyun
(Continued)

FOREIGN PATENT DOCUMENTS

CN 101170901 A 4/2008
CN 103700237 A 4/2014
(Continued)

OTHER PUBLICATIONS

Translation of First Office Action for Chinese Patent Application No. 202080041249.0, Aug. 19, 2022, 16 pages.
(Continued)

*Primary Examiner* — Dani Fox
(74) *Attorney, Agent, or Firm* — Schwegman Lundberg & Woessner, P.A.

(57) ABSTRACT

A device, system, and method of controlling pests are disclosed. The system includes an active infrared sensor including infrared emitters and photodetectors. The active infrared sensor is configured to determine an active infrared signature for a monitored space, determine whether the active infrared signature is outside a predetermined window in relation to a baseline signature, and activate a controller in response to determining that the active infrared signature (Continued)

is outside the window. The controller is configured to perform a pest control action in response to activation. The pest control action may include notifying a remote system. The active infrared sensor may be included in a housing having a first opening, a second opening, and a passage sized to receive an insect. The active infrared sensor may be coupled to the housing such that the active infrared sensor is positioned to illuminate part of the passage.

20 Claims, 15 Drawing Sheets

(56) References Cited

U.S. PATENT DOCUMENTS

| | | | |
|---|---|---|---|
| 7,656,300 | B2 | 2/2010 | Roennau |
| 9,257,030 | B2 | 2/2016 | Gettings et al. |
| 9,510,582 | B2 | 12/2016 | David et al. |
| 9,664,813 | B2 | 5/2017 | Jant et al. |
| 10,220,109 | B2 | 3/2019 | Becker |
| 10,417,780 | B2 | 9/2019 | Freudenberg et al. |
| 10,588,306 | B2 | 3/2020 | Hur et al. |
| 10,713,631 | B2 | 7/2020 | Glaser |
| 10,991,230 | B2 | 4/2021 | Triventi et al. |
| 11,083,183 | B2 | 8/2021 | Deering et al. |
| 11,234,429 | B2 | 2/2022 | Files et al. |
| 11,241,002 | B2 | 2/2022 | Jay |
| 11,382,324 | B2 | 7/2022 | Janét et al. |
| 11,406,095 | B2 | 8/2022 | Chang et al. |
| 2006/0123693 | A1* | 6/2006 | Muller ............... A01M 31/002 43/99 |
| 2008/0096581 | A1 | 4/2008 | Do et al. |
| 2010/0102926 | A1 | 4/2010 | Grieve et al. |
| 2011/0290882 | A1 | 12/2011 | Gu et al. |
| 2014/0123543 | A1 | 5/2014 | Osseiran |
| 2015/0320029 | A1* | 11/2015 | Noe ..................... G01J 5/0025 43/98 |
| 2016/0235050 | A1 | 8/2016 | Janét et al. |
| 2016/0277688 | A1 | 9/2016 | Gaskamp et al. |
| 2017/0035041 | A1* | 2/2017 | Othon ................... A01M 23/20 |
| 2018/0136319 | A1 | 5/2018 | Send et al. |
| 2021/0392866 | A1 | 12/2021 | Kaye et al. |
| 2022/0232813 | A1 | 7/2022 | Edwards, Jr. |

FOREIGN PATENT DOCUMENTS

| | | |
|---|---|---|
| EP | 3945802 | 2/2022 |
| HK | 40063793 | 3/2024 |
| JP | 2000125744 | 5/2000 |
| JP | 2001190211 | 7/2001 |
| JP | 2011510649 | 4/2011 |
| JP | 2013051895 | 3/2013 |
| JP | 2013243956 | 12/2013 |
| JP | 2020517020 | 6/2020 |
| KR | 20080109307 | 12/2008 |
| NZ | 780911 | 10/2021 |
| WO | 2014125158 | 8/2014 |
| WO | 2015139091 | 9/2015 |
| WO | 2020206089 | 10/2020 |

OTHER PUBLICATIONS

PCT International Search Report and International Preliminary Report on Patentability for International Application No. PCT/US2020/026343, Sep. 3, 2020, 10 pages.

"Japanese Application Serial No. 2021-559240, Response filed Jun. 4, 2024 to Notification of Reasons for Refusal mailed Mar. 5, 2024", w current English claims, 20 pgs.

International Search Report and Written Opinion for PCT/US2020/026343 dated Sep. 3, 2020.

"European Application Serial No. 20781830.3, Extended European Search Report mailed Dec. 8, 2022", 8 pgs.

"Japanese Application Serial No. 2021-559240, Notification of Reasons for Refusal mailed Mar. 5, 2024", w English Translation, 10 pgs.

"European Application Serial No. 20781830.3, Response filed May 25, 2023 to Extended European Search Report mailed Dec. 8, 2022", 12 pgs.

Noskov, Alexey, "A Review of Insect Monitoring Approaches with Special Reference to Radar Techniques", Sensors 2021, 21, 1474, (Feb. 20, 2021), 23 pgs.

Sciarretta, Andrea, "Development of Automated Devices for the Monitoring of Insect Pests", Curr. Agri. Res., vol. 7(1) 19-25, 2019., (Apr. 16, 2019), 7 pgs.

"Japanese Application Serial No. 2021-559240, Decision of Rejection mailed Oct. 1, 2024", w Machine English Translation, 7 pgs.

"New Zealand Application Serial No. 780911, First Examination Report mailed Jun. 11, 2024", 4 pgs.

* cited by examiner

ADAPTIVE ACTIVE INFRARED SENSOR HARDWARE AND SOFTWARE IN THE DETECTION OF PESTS WITH PEST DETECTION STATION

CROSS REFERENCE TO RELATED APPLICATIONS

This application is a U.S. national stage application under 35 U.S.C. § 371(b) of International Application No. PCT/US2020/026343 filed Apr. 2, 2020, which claims priority to the U.S. Patent Application No. 62/828,617 filed on Apr. 3, 2019 and U.S. Patent Application No. 62/927,807 filed on Oct. 30, 2019, the disclosures of both of which are hereby expressly incorporated by reference in their entirety.

TECHNICAL FIELD

The present disclosure relates generally to devices for controlling pests, and, more specifically, to devices for monitoring and communicating the presence of rodents or insects.

BACKGROUND

The detection and removal of pests from areas occupied by humans, livestock, crops, and other pest-attracting areas has long been a challenge. Pests of frequent concern include various types of insects and rodents. Subterranean termites are a particularly troublesome type of pest with the potential to cause severe damage to wooden structures. Likewise, other insects, such as bedbugs and cockroaches, are problematic. Additionally, rodent control is often challenging. Various schemes have been proposed to eliminate these and certain other harmful pests. Some of those schemes use one or more stations, which must be periodically checked by service personnel. Similarly, rodent traps in residential and commercial settings need to be routinely checked by service personnel.

SUMMARY

According to one aspect of the disclosure, a pest control device is disclosed. The pest control device includes an active infrared sensor, a controller, a pest detection module, and a response module. The pest detection module is configured to determine, by the active infrared sensor, an active infrared signature for a monitored space; determine, by the active infrared sensor, whether the active infrared signature is outside a predetermined window in relation to a predetermined baseline signature; and activate, by the active infrared sensor, the controller of the pest control device in response to a determination that the active infrared signature is outside the predetermined window. The response module is configured to perform, by the controller, a pest control action in response to activation of the controller.

In some embodiments, to determine the active infrared signature may include to measure an ambient infrared light value with a photodetector of the pest control device; to activate an infrared emitter of the pest control device; to measure a pulse infrared light value with the photodetector in response to activating the infrared emitter; and to determine the active infrared signature as a difference between the pulse infrared light value and the ambient infrared light value. In some embodiments, to activate the infrared emitter may include to activate a plurality of infrared light emitting diodes in a time series, wherein the plurality of light emitting diodes are positioned apart from each other; and to measure the pulse infrared light value may include to measure a time series of infrared light values with one or more photodiodes.

In some embodiments, the pest control device may further include a spatial module to construct, by the controller, a three-dimensional representation of a monitored space as a function of the time series of infrared light values.

In some embodiments, to determine whether the active infrared signal is outside the predetermined window may include to determine whether the active infrared signal has a first predetermined relationship with a high threshold value or a second predetermined relationship with a low threshold value. In some embodiments, to determine whether the active infrared signature is outside the predetermined window may include to determine whether the active infrared signature is outside the predetermined window for more than a predetermined debounce interval; and to activate the controller may include to activate the controller in response to a determination that the active infrared signature is outside the predetermined window for more than the predetermined debounce interval.

In some embodiments, to activate the controller may include to assert, by the active infrared sensor, an interrupt to the controller; and to wake, by the controller, from a low power state to an active state in response to assertion of the interrupt. In some embodiments, to perform the pest control action may include to record a pest event in a data storage device of the pest control device. In some embodiments, to perform the pest control action may include to send a notification to a remote device via a wireless communication. In some embodiments, to send the notification may include to send the notification via a low-power wide-area network wireless radio communication.

In some embodiments, the pest control device may further include a calibration module configured to calibrate, by the controller, an infrared emitter of the active infrared sensor based on an environment of the pest control device; wherein to determine the active infrared signature may include to determine the active infrared signature in response to calibration of the infrared emitter. In some embodiments, to calibrate the infrared emitter may include to activate the infrared emitter; to measure a pulse infrared light value with a photodetector of the pest control device in response to activation of the infrared emitter; to compare the pulse infrared light value to a predetermined threshold; and to adjust an intensity of the infrared emitter in response to a comparison of the pulse infrared light value to the predetermined threshold. In some embodiments, to calibrate the infrared emitter may include to calibrate the infrared emitter in response to a maintenance event. In some embodiments, to calibrate the infrared emitter may include to calibrate the infrared emitter in response to a command. In some embodiments, to calibrate the infrared emitter may include to periodically calibrate the infrared emitter.

In some embodiments, the pest control device may further include an adaptive baseline module configured to determine, by the active infrared sensor, the predetermined baseline signature for the monitored space; wherein to determine the active infrared signature may include to determine the active infrared signature in response to a determination of the predetermined baseline signature. In some embodiments, the adaptive baseline module may be further configured to adapt, by the controller, the predetermined baseline signature based on a previous baseline signature.

In some embodiments, the pest control device is included in a chamber of a pest station, wherein the chamber is sized to receive a rodent, and wherein the monitored space is included in the chamber. In some embodiments, bait is positioned in the chamber of the pest station.

According to another aspect, a method for monitoring for rodents is disclosed. The method includes determining, by an active infrared sensor of a pest control device, an active infrared signature for a monitored space; determining, by the active infrared sensor of the pest control device, whether the active infrared signature is outside a predetermined window in relation to a predetermined baseline signature; activating, by the pest control device, a controller of the pest control device in response to determining that the active infrared signature is outside the predetermined window; and performing, by the controller, a pest control action in response to activating the controller.

In some embodiments, determining the active infrared signature may include measuring an ambient infrared light value with a photodetector of the pest control device; activating an infrared emitter of the pest control device; measuring a pulse infrared light value with the photodetector in response to activating the infrared emitter; and determining the active infrared signature as a difference between the pulse infrared light value and the ambient infrared light value. In some embodiments, activating the infrared emitter may include activating a plurality of infrared light emitting diodes in a time series, wherein the plurality of light emitting diodes are positioned apart from each other; and measuring the pulse infrared light value includes measuring a time series of infrared light values with one or more photodiodes.

In some embodiments, the method may further include constructing a three-dimensional representation of a monitored space as a function of the time series of infrared light values.

In some embodiments, determining whether the active infrared signal is outside the predetermined window may include determining whether the active infrared signal has a first predetermined relationship with a high threshold value or a second predetermined relationship with a low threshold value. In some embodiments, determining whether the active infrared signature is outside the predetermined window may include determining whether the active infrared signature is outside the predetermined window for more than a predetermined debounce interval; and activating the controller includes activating the controller in response to determining that the active infrared signature is outside the predetermined window for more than the predetermined debounce interval.

In some embodiments, activating the controller may include asserting, by the active infrared sensor, an interrupt to the controller; and waking, by the controller, from a low power state to an active state in response to asserting the interrupt. In some embodiments, performing the pest control action may include recording a pest event in a data storage device of the pest control device. In some embodiments, performing the pest control action may include sending a notification to a remote device via a wireless communication. In some embodiments, sending the notification may include sending the notification via a low-power wide-area network wireless radio communication.

In some embodiments, the method may further include calibrating, by the controller, an infrared emitter of the active infrared sensor based on an environment of the pest control device; wherein determining the active infrared signature includes determining the active infrared signature in response to calibrating the infrared emitter. In some embodiments, calibrating the infrared emitter may include activating the infrared emitter; measuring a pulse infrared light value with a photodetector of the pest control device in response to activating the infrared emitter; comparing the pulse infrared light value to a predetermined threshold; and adjusting an intensity of the infrared emitter in response to comparing the pulse infrared light value to the predetermined threshold. In some embodiments, calibrating the infrared emitter may include calibrating the infrared emitter in response to a maintenance event. In some embodiments, calibrating the infrared emitter may include calibrating the infrared emitter in response to a command. In some embodiments, calibrating the infrared emitter may include periodically calibrating the infrared emitter.

In some embodiments, the method may further include determining, by the active infrared sensor, the predetermined baseline signature for the monitored space; wherein determining the active infrared signature includes determining the active infrared signature in response to determining the predetermined baseline signature. In some embodiments, the method may further include adapting, by the pest control device, the predetermined baseline signature based on a previous baseline signature.

According to another aspect, a pest control system for detecting insects is disclosed. The pest control system includes a pest control device and a housing. The pest control device includes an active infrared sensor. The housing includes a first opening, a second opening, and a passage, wherein the first opening and the second opening are in communication with either end of the passage, and wherein the passage is sized to receive an insect. The pest control device is coupled to the housing such that the active infrared sensor is positioned to illuminate a first part of the passage.

In some embodiments, the passage may include an upper ceiling having a ceiling opening positioned above the first part of the passage; and the active infrared sensor may be positioned to illuminate the first part of the passage through the ceiling opening.

In some embodiments, the housing may further include a bait chamber positioned adjacent to the first part of the passage and a window positioned between the first part of the passage and the bait chamber, wherein the window is sized to exclude the insect.

In some embodiments, the housing may further include a first wall, a second wall, a floor, and a ceiling that cooperate to define the first opening, wherein the first opening narrows to the passage. In some embodiments, the floor may define a ramp from the first opening to the passage.

In some embodiments, the passage may be sized to receive an American cockroach. In some embodiments, the passage may have a height of about 17 millimeters. In some embodiments, the height of the passage may extend from a floor of the passage to the active infrared sensor of the pest control device. In some embodiments, the passage may have a width of about 17 millimeters.

In some embodiments, the pest control device may further include a pest detection module and a response module. The pest detection module is configured to (i) determine, by the active infrared sensor, an active infrared signature for the first part of the passage, and (ii) determine, by the active infrared sensor, whether the active infrared signature is outside a predetermined window in relation to a predetermined baseline signature. The response module is configured to perform a pest control action in response to a determination that the active infrared signature is outside the predetermined window.

According to another aspect, a pest control system for detecting insects is disclosed. The pest control system includes a top cover, a pest control device, an insert, and a base. The top cover is removably coupled to the base. The pest control device is removably coupled within an interior volume of the top cover. The insert is removably coupled within the interior volume of the top cover below the pest control device and above the base. The base includes a floor, a first wall, and a second wall that cooperate to define a first opening, a second opening, and a passage in communication with the first opening and the second opening, wherein the passage is sized to receive an insect. The insert includes a bottom surface that defines a ceiling of the passage of the base, and wherein the insert includes an opening through the bottom surface positioned above a first part of the passage. The pest control device includes an active infrared sensor positioned on a bottom surface of the pest control device and above the opening of the insert and above the first part of the passage, wherein the active infrared sensor is configured to illuminate the first part of the passage.

In some embodiments, the base may further include a bait chamber positioned adjacent to the first part of the passage and partial wall positioned between the first part of the passage and the bait chamber, wherein the partial wall is sized to exclude the insect.

In some embodiments, the top cover may include a plurality of vertical ribs that extend into the interior volume of the top cover, wherein the plurality of vertical ribs engage a side wall of the pest control device. The insert may include a plurality of slots, wherein each of the slots is sized to receive a vertical rib of the plurality of vertical ribs.

In some embodiments, the base may include a plurality of posts; the insert may include plurality of through holes, wherein each through hole is sized to receive a post; and the top cover may include plurality of lugs, wherein each lug is sized to receive a post.

In some embodiments, wherein the passage may have a height of about 17 millimeters. In some embodiments, the height of the passage may extend from a floor of the passage to the bottom surface of the insert.

According to another aspect, a pest station for detecting insects is disclosed. The pest station includes a base and a top cover. The base includes a floor, a first wall, and a second wall that cooperate to define a first opening, a second opening, and a passage in communication with the first opening and the second opening, wherein the passage is sized to receive an insect. The top cover is removably coupled to the base, wherein the top cover comprises an interior volume sized to receive a pest control device, wherein the interior volume is open to a first part of the passage.

In some embodiments, the top cover may include a plurality of vertical ribs that extend into the interior volume of the top cover, wherein the plurality of vertical ribs are configured to engage the pest control device. In some embodiments, the top cover may include a bottom surface that defines a ceiling of the passage, and wherein the top cover includes an opening in the bottom surface positioned above the first part of the passage.

In some embodiments, the pest station may further include an insert removably coupled within the interior volume of the top cover above the base, wherein the insert includes a bottom surface that defines a ceiling of the passage of the base, and wherein the insert includes an opening through the bottom surface positioned above a first part of the passage.

BRIEF DESCRIPTION OF THE DRAWINGS

The detailed description particularly refers to the following figures, in which.

DETAILED DESCRIPTION OF THE DRAWINGS

Figure 1:
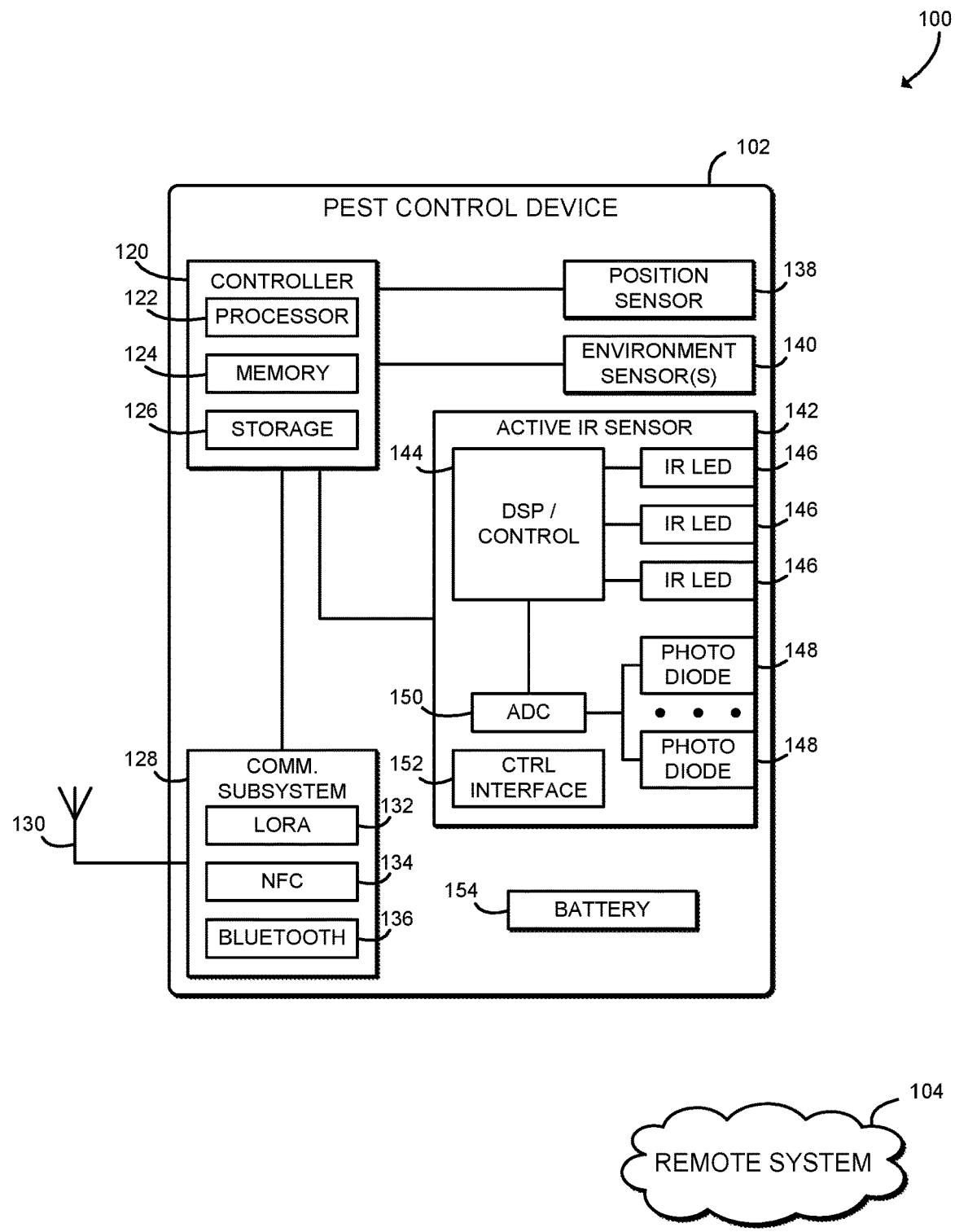
FIG. 1 is a simplified block diagram of a pest control system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a pest control system 100 includes a pest control device 102. The pest control device 102 may be positioned in a monitored space such as a runway, a ceiling, a kitchen, a bathroom, a residential or commercial space, or other monitored space, and/or may be coupled to or included in a baiting station, multi-catch trap, or other pest control station. In particular, the pest control device 102 may be included or otherwise coupled to a pest control station as illustrated in various embodiments in FIGS. 8-14 and 16-18. In use, as described further below, a controller 120 of the pest control device 102 calibrates an active infrared (IR) sensor 142 of the pest control device 102 based on the environment of the pest control device 102. The active IR sensor 142 illuminates the environment with one or more infrared emitters and measures the infrared response with one or more photodetectors. If the infrared response is outside of a predetermined window, indicating the presence of a pest such as a rodent, insect, or similar, the active IR sensor 142 wakes the controller 120, which may perform a pest control action such as notifying a remote system 104. Accordingly, the pest control system 100 may detect pests without requiring the pests to directly contact a trigger or perform another direct interaction with the pest/trap. Thus, the pest control system 100 may provide improved monitoring of pest control stations or other spaces while also providing low power consumption. For example, in some embodiments, the pest control system 100 may provide for at least four years of monitoring on a single battery, which may reduce maintenance and replacement costs. Additionally, as described further below, the pest control system 100 may adapt to changes in the environment and/or changes to the pest control device 102 over a long service life.

As shown in FIG. 1, the illustrative pest control device 102 includes the controller 120, a communication subsystem 128, and the active IR sensor 142. The controller 120 may be embodied as an electronic controller, electronic control unit (ECU), or other control device. The controller 120 is illustratively embodied as a lower-power microcontroller device such as a MSP430 Series microcontroller, which is commercially available from Texas Instruments of Dallas, Texas, or an STM32 microcontroller, which is commercially available from STMicroelectronics of Geneva, Switzerland. In other embodiments, other commercially-available microcontrollers, discrete processing circuits (e.g., a collection of logic devices), general purpose integrated circuit(s), and/or application specific integrated circuit(s) (i.e., ASICs) may be used to control the operation of the pest control device 102. In the illustrative embodiment, the controller 120 may be connected to other components of the pest control device 102 via a number of communication links, such as printed circuit board traces, wires, cables, and the like.

The controller 120 is, in essence, the master computer responsible for interpreting electrical signals sent by sensors associated with the pest control device 102 and for activating or energizing electronically-controlled components associated with the pest control device 102. For example, the controller 120 is configured to control operation of the active IR sensor 142 and the communication subsystem 128. The controller 120 also may monitor various signals from other sensors and determine when various operations of the pest control device 102 should be performed. As will be described in more detail below with reference to FIGS. 3-6, the controller 120 is operable to control the components of the pest control device 102 such that the pest activity and other information is communicated to the remote system 104.

The controller 120 includes a number of electronic components commonly associated with electronic units utilized in the control of electromechanical systems. For example, the controller 120 includes, amongst other components customarily included in such devices, a processor such as a microprocessor 122, a memory device 124 such as a random access memory (RAM) device or other volatile or non-volatile memory device, and a storage device 126 such as programmable read-only memory device ("PROM") including erasable PROM's (EPROM's or EEPROM's), a non-volatile random access memory device (NVRAM), a flash memory device, or other storage device. The storage device 126 is provided to store, amongst other things, instructions in the form of, for example, a firmware routine (or routines) which, when executed by the microprocessor 122, allows the controller 120 to control operation of the pest control device 102. The data storage device 126 may also store recorded pest event data or other data generated by the pest control device 102.

The controller 120 may be coupled to other components of the pest control device 102 via one or more I/O interfaces or other digital signal links. In some embodiments, the controller 120 may also include an analog interface circuit to convert analog signals generated by sensors into digital signals which are suitable for presentation to the microprocessor 122 and/or to convert signals from the microprocessor 122 into output signals which are suitable for presentation to the electrically-controlled components of the pest control device 102.

The communications subsystem 128 may be embodied as any communication circuit, device, transceiver, or collection thereof, capable of enabling communications between the pest control device 102 and one or more remote systems 104. The communications subsystem 128 may be configured to use any one or more communication technology (e.g., wired or wireless communications) and associated protocols (e.g., Ethernet, Bluetooth®, LoRa, NFC, Wi-Fi®, WiMAX, 3G, 4G LTE, 5G, etc.) to effect such communication.

As shown, the communication subsystem 128 includes a long range (LoRa) radio circuitry 132, which provides long-range, low-power wireless radio communication. In the illustrative embodiment, the LoRa circuitry 132 is capable of communication in the unlicensed 915 MHz Industrial, Scientific, and Medical (ISM) frequency band. In other embodiments, the communication subsystem 128 may provide other low-power wide-area network (LPWAN) communication technologies. The illustrative communication subsystem 128 further includes NFC circuitry 134, which allows for short-ranged radio communication with another device equipped with complementary NFC circuitry. The NFC circuitry 134 may be embodied as relatively short-ranged, high-frequency wireless communication circuitry. The NFC circuitry 134 may implement standards such as ECMA-340/ISO/IEC 18092 and/or ECMA-352/ISO/IEC 21481 to communicate with corresponding NFC circuitry of another device. The NFC circuitry 134 may allow for communication ranges on the order of a few centimeters, as when a mobile communication device (e.g., a smartphone) is tapped or waved near a corresponding part of the pest control device 102. As described further below, the NFC circuitry 134 may be used to communicate management or configuration commands and/or data to the pest control device 102. The communication subsystem 128 further includes a Bluetooth module 136, which may provide Bluetooth, Bluetooth Low Energy, or other personal area network (PAN) communication capabilities.

As shown in FIG. 1, the communication subsystem 128 is coupled to an antenna 130, which may be embodied as a whip antenna consisting of a single straight flexible metal wire, a loop antenna, a low-profile helical antenna, a hardware circuit in the pest control device 102, or other type of antenna capable of transmitting and receiving signals between the pest control device 102 and the remote system 104. Although illustrated as a single antenna 130, it should be understood that in certain embodiments the pest control device 102 may include multiple antennas 130 (e.g., a whip antenna for the LoRa circuitry 132, a loop antenna for NFC circuitry 134, and/or other antennas).

The pest control device 102 also includes a position sensor 138 and a number of environmental sensors 140 to provide information about the monitored space and the pest control device 102. The position sensor 138 may be embodied as an accelerometer, gyroscope, or other position sensor configured to detect movement of the pest control device 102. In the illustrative embodiment, the position sensor 138 is a 3-axis digital accelerometer such as, for example, the MMA8652, which is commercially available from Freescale, or the LIS2DH12, which is commercially available from STMicroelectronics. The position sensor 138 detects movement of the pest control device 102 and transmits a signal indicative of that movement to the controller 120. In other embodiments, the position sensor 138 may be a Hall-Effect sensor that detects the proximity of the sensor 138 (and hence the pest control device 102) to a magnetic anchor secured to the ground, secured to a pest control station housing, or otherwise separated from the pest control device 102. It should be appreciated that in other embodiments the position sensor 138 may be omitted.

The environmental sensors 140 may include a temperature sensor configured to measure the temperature of the environment surrounding the pest control device 102, such as, for example, the STLM75, which is commercially available from STMicroelectronics. The temperature sensor is configured to take a temperature measurement and transmit a signal indicative of that measurement to the controller 120. It should be appreciated that in other embodiments the pest control device 102 may include other environmental sensors 140 that measure humidity, air quality, dampness, or other factors that may affect the operation of the pest control device 102 or the status of an associated pest control station.

As shown in FIG. 1, the controller 120 is further coupled to the active IR sensor 142. The active IR sensor 142 includes a digital signal processor (DSP) or other control circuit 144, multiple infrared light-emitting diodes (IR LEDs) 146, multiple photodiodes 148, one or more analog-to-digital converters (ADC) 150, and a control interface 152. The active IR sensor 142 may be embodied as or derived from a proximity/ambient light sensor such as an Si115x family device, commercially available from Silicon Labs.

The DSP 144 may be embodied as any DSP, microcontroller, microprocessor, or other signal processing and control device. The DSP 144 may include, among other components customarily included in such devices, one or more memory devices, firmware devices, storage devices, or other components. For example, the DSP 144 may include a storage device provided to store, amongst other things, instructions in the form of, for example, a firmware routine (or routines) which, when executed by the DSP 144 allows the active IR sensor 142 to autonomously sense the monitored space.

Each IR LED 146 may be embodied as any LED or other infrared light emitter configured to generate infrared light. As described further below, the IR LEDs 146 illuminate the monitored space to detect the presence of pests, such as rodents or insects. The IR LEDs 146 may emit infrared light with a wavelength of about 860-870 nm, which may prevent interference from ambient IR light (e.g., IR light present in daylight). Although illustrated as including the IR LEDs 146 in the active IR sensor 142, in some embodiments the IR LEDs 146 may be discrete components coupled to the active IR sensor 142. In those embodiments, the active IR sensor 142 may include one or more LED drivers or other LED driving circuits coupled to the IR LEDs 146. In some embodiments, multiple IR LEDs 146 may be positioned in predetermined relative positions on the exterior of the pest control device 102. In those embodiments, the IR response from the multiple IR LEDs 146 may be processed to generate a three-dimensional representation of the monitored space.

Each photodiode 148 may be embodied as any diode or other photodetector capable of detecting IR and/or visible light. In some embodiments, the active IR sensor 142 may include or be coupled with one or more filters to reject unwanted visible and/or IR light. The photodiodes 148 are coupled to the ADC 150, which are configured to convert analog or digital signals generated by the photodiodes 148 into counts or other digital data that may be processed by the DSP 144. The sensitivity of the ADC 150 can be adjusted, for example to adapt to varying ambient light conditions.

The control interface 152 is illustratively an inter-integrated circuit ($I^2C$) engine that enables communication between the active IR sensor 142 and the controller 120. The control interface 152 allows the controller 120 to configure the active IR sensor 142 and read sensor data from the active IR sensor 142 by reading and writing various registers of the active IR sensor 142. In other embodiments, the control interface 152 may be embodied as a serial peripheral interface (SPI) link, a peripheral component interconnect (PCI) bus, or any other bus, interconnect, or control interface.

As shown in FIG. 1, the pest control device 102 is powered by a local battery 154. In the illustrative embodiment, the battery 154 is a lithium thionyl chloride battery that is not replaceable. The low power consumption of the pest control device 102 allows for long service life with the non-replaceable battery 154. For example, in an illustrative embodiment the battery 154 may have a capacity of 2400 mAh, and the pest control device 102 may draw less than 10 µA current on average with no pests being detected and not including radio communications. Power consumption may increase slightly when pests are detected. It should be appreciated that in other embodiments other battery types may be used. In still other embodiments, the pest control device 102 may utilize an external power source.

Figure 2:
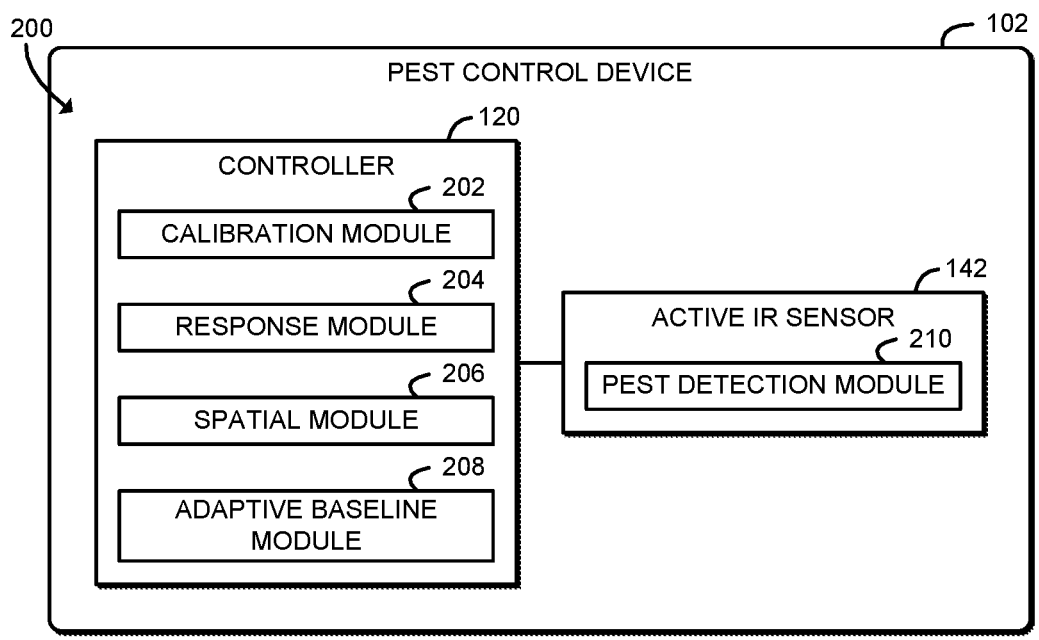
FIG. 2 is a simplified block diagram of at least one embodiment of an environment that may be established by a pest control device of the system of FIG. 1.

Referring now to FIG. 2, in an illustrative embodiment, the pest control device 102 establishes an environment 200 during operation. The illustrative environment 200 includes a calibration module 202, a response module 204, a spatial module 206, an adaptive baseline module 208, and a pest detection module 210. The various components of the environment 200 may be embodied as hardware, firmware, software, or a combination thereof. As such, in some embodiments, one or more of the components of the environment 200 may be embodied as circuitry or collection of electrical devices (e.g., calibration circuitry 202, response circuitry 204, spatial circuitry 206, adaptive baseline circuitry 208, and/or pest detection circuitry 210). It should be appreciated that, in such embodiments, one or more of the calibration circuitry 202, the response circuitry 204, the spatial circuitry 206, the adaptive baseline circuitry 208, and/or the pest detection circuitry 210 may form a portion of the controller 120, the active IR sensor 142, and/or other and/or other components of the pest control device 102. Additionally, in some embodiments, one or more of the illustrative components may form a portion of another component and/or one or more of the illustrative components may be independent of one another.

The calibration module 202 is configured to calibrate one or more IR emitters 146 of the active IR sensor 142 based on an environment of the pest control device 102. The IR emitter 146 may be calibrated periodically or responsively (e.g., in response to a maintenance event or a command). Calibrating the IR emitter 146 may include activating the IR emitter 146, measuring a pulse IR light value with a photodetector 148 of the pest control device 102 in response to activating the IR emitter 146, comparing the pulse infrared light value to a predetermined threshold, and adjusting an intensity of the IR emitter 146 based on the comparison.

The pest detection module 210 is configured to determine an active IR signature for a monitored space with the active IR sensor 142. The active IR signature may be determined after calibrating the IR emitters 146. The active IR signature may be determined periodically, for example every two seconds. Determining the active IR signature may include measuring an ambient IR light value with the photodetector 148, activating the IR emitter 146 and measuring a pulse IR light value with the photodetector 148 in response to activating the IR emitter 146, and determining the active IR signature as the difference between the pulse IR light value and the ambient IR light value.

The pest detection module 210 is further configured to determine whether the active IR signature is outside a predetermined window in relation to a predetermined baseline signature. Determining whether the active IR signal is outside the predetermined window may include determining whether the active IR signal has a predetermined relationship (e.g., greater than, greater than or equal to, etc.) with a high threshold value or has a predetermined relationship (e.g., less than, less than or equal to, etc.) with a low threshold value. Determining whether the active IR signature is outside the predetermined window may include determining whether the active IR signature is outside the window for more than a predetermined debounce interval (e.g., 500 ms). The pest detection module 210 is further configured to activate the controller 120 of the pest control device in response to determining that the active infrared signature is outside the predetermined window, for example by asserting an interrupt to the controller 120.

The response module 204 is configured to perform a pest control action in response to activation of the controller 120. In some embodiments, the controller 120 may wake from a low power state to an active state in response to activation of the controller 120. Performing the pest control action may include recording a pest event in a data storage device of the pest control device 102 or sending a notification to the remote system 104 via a wireless communication (e.g., via a low-power wide-area network wireless radio communication).

Some embodiments of the environment 200 may include the spatial module 206, which is configured to construct a three-dimensional representation of a monitored space as a function of a time series of infrared light values measured by the photodiodes 148. In those embodiments, multiple IR LEDs 146 positioned apart from each other may be activated in a time series, and in response the time series of IR light values may be measured with the photodiodes 148.

The adaptive baseline module 208 is configured to determine the predetermined baseline signature for the monitored space. The adaptive baseline module 208 may be further configured to adapt the predetermined baseline signature based on a previous baseline signature.

As shown, in the illustrative embodiment the calibration module 202, the response module 204, the spatial module 206, and the adaptive baseline module 208 are established by the controller 120 and thus in the illustrative embodiment, the operations of those modules are performed by the controller 120. However, in other embodiments some or all of the functions of those modules may be performed by the active IR sensor 142. Similarly, in the illustrative embodiment the pest detection module 210 is established by the active IR sensor 142 and thus in the illustrative embodiment, the operations of the pest detection module 210 are performed by the active IR sensor 142. However, in other embodiments some or all of the functions of the pest detection module 210 may be performed by the controller 120.

Figure 3:
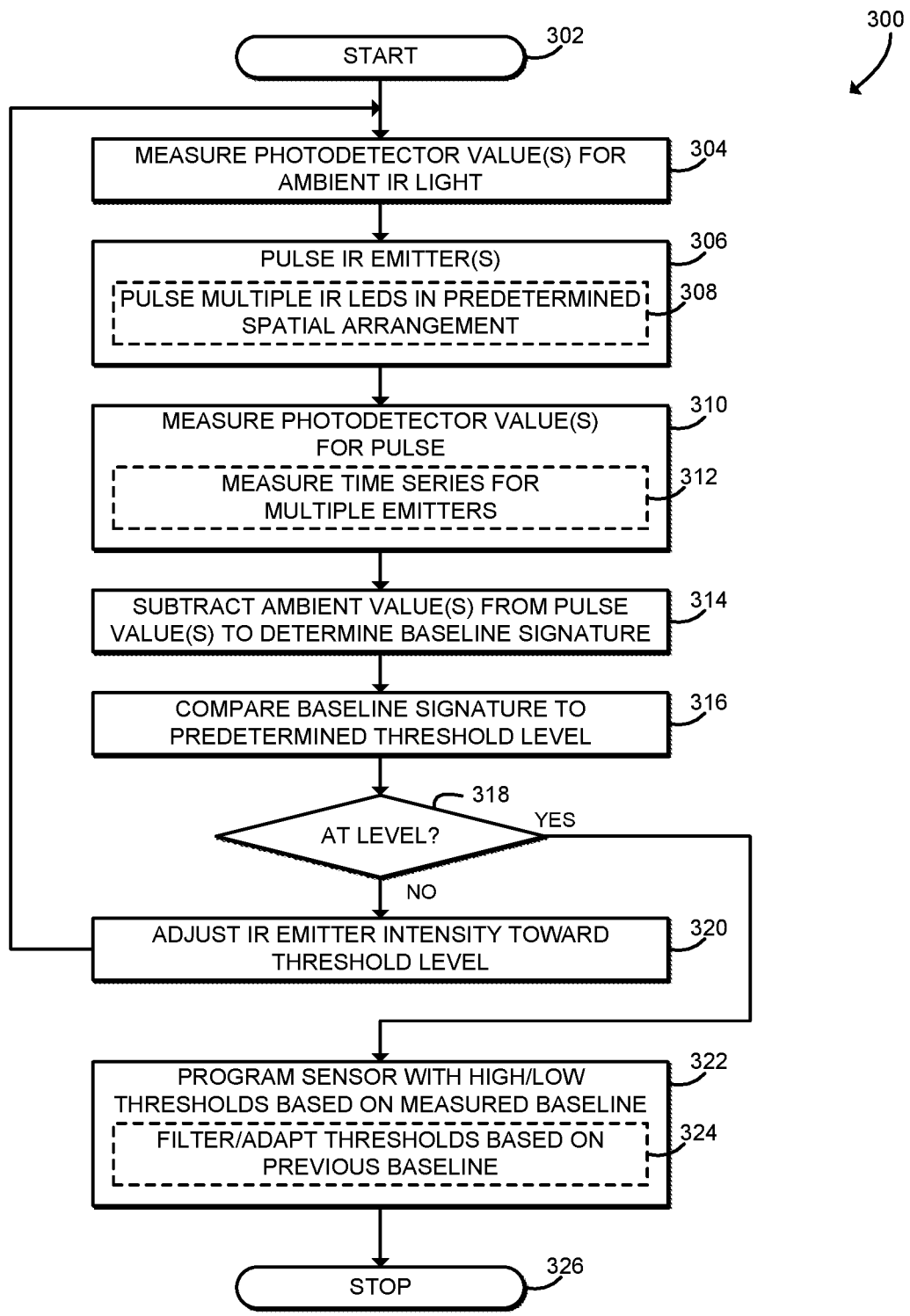
FIG. 3 is a simplified flow diagram of at least one embodiment of a method for configuring an active infrared sensor that may be executed by the pest control device of FIGS. 1-2.

Referring now to FIG. 3, in use, the pest control device 102 may execute a method 300 for configuring the active IR sensor 142. It should be appreciated that, in some embodiments, the operations of the method 300 may be performed by one or more components of the environment 200 of the pest control device 102 as shown in FIG. 2, such as the controller 120 and/or the active IR sensor 142. The method 300 begins in block 302, in which the pest control device 102 starts configuring the active IR sensor 142. The method 300 may start, for example, in response to a power cycle, physical access by a technician, or other maintenance event of the pest control device 102. As another example, the method 300 may start in response to a command received from another device, such as a command received via the NFC circuitry 134 from a mobile communication device (e.g., a smartphone). As another example, in some embodiments the method 300 may start periodically or otherwise repeatedly over time to allow the active IR sensor 142 to be reconfigured over time.

In block 304, the pest control device 102 measures photodetector 148 values for ambient light in the environment of the pest control device 102. The ambient light is measured without activating the IR emitters 146. The ambient light values may be read by the DSP 144 and/or by the controller 120.

Figure 7:
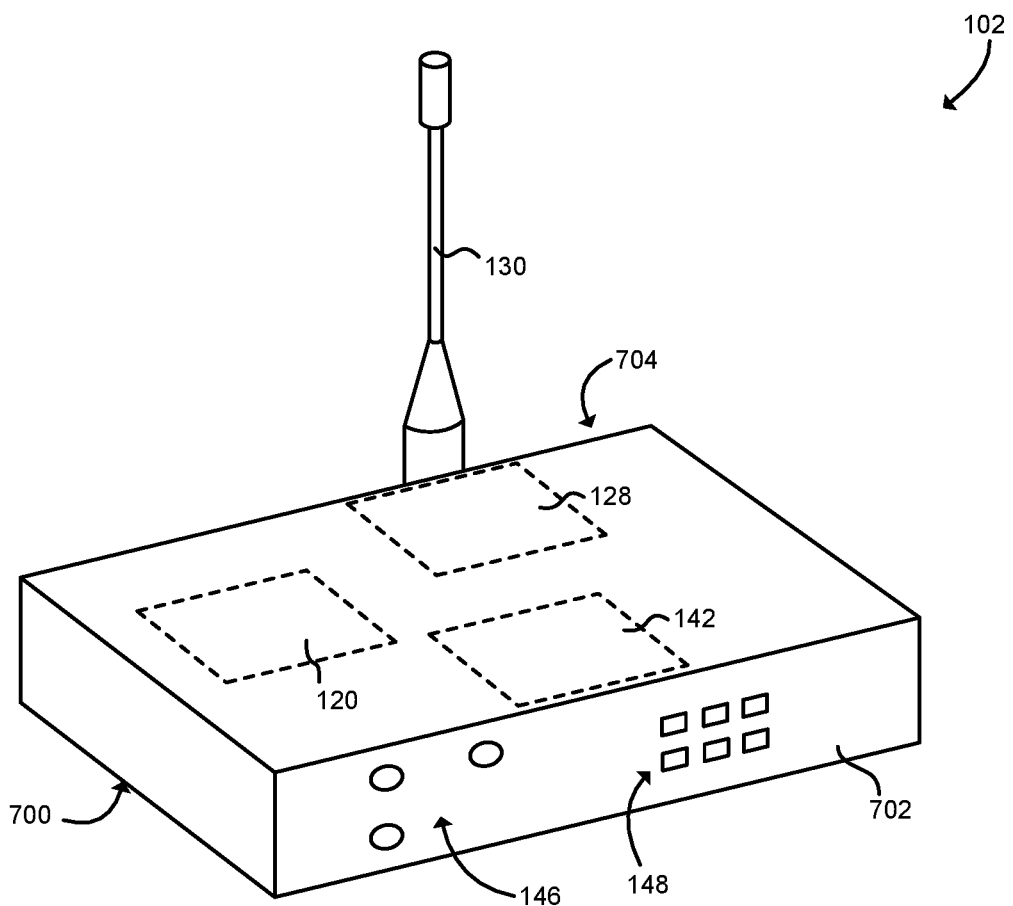
FIG. 7 is a perspective view of the pest control device of FIGS. 1-2.

In block 306, the pest control device 102 pulses the IR emitters 146. Pulsing the IR emitters 146 illuminates the monitored space with IR light. The intensity of the IR pulse may be configured, for example by configuring the amount of current used to drive the IR LEDs 146, by configuring the length of the IR pulse, or otherwise. The IR light may reflect from objects in the monitored space or be absorbed by objects in the monitored space. In some embodiments, in block 308 the pest control device 102 may pulse multiple IR LEDs 146 that are positioned in a predetermined spatial arrangement. For example, the IR LEDs 146 may be positioned apart from each other in an "L" arrangement as shown in FIG. 7. In those embodiments, the IR LEDs 146 may be pulsed in sequence.

In block 310, the pest control device 102 measures photodetector 148 values associated with the IR pulse. The pulse value measures the amount of ambient IR light in the environment as well as the IR light emitted from the IR emitters 146 that is reflected off of objects in the environment back to the photodetectors 148. In some embodiments, in block 312 the pest control device 102 may measure a time series of photodetector 148 values. For example, when multiple IR LEDs 146 are pulsed in sequence, the pest control device 102 may measure the received IR light over time.

In block 314, the pest control device 102 subtracts the ambient IR light values from the pulse IR light values to determine a baseline signature for the environment of the pest control device 102. The baseline signature is indicative of the IR reflectance of objects in the environment of the pest control device 102 when no pests are present (i.e., at the time of calibration). For example, the baseline signature may be indicative of the interior of a pest control station with no pests present. As another example, the baseline signature may be indicative of a runway or other monitored space in which the pest control device 102 is positioned. As described below in connection with FIGS. 4 and 5, the baseline signature may be compared with measured active IR signatures to determine whether pests are detected.

In block 316, the pest control device 102 compares the baseline signature to a predetermined threshold level. For example, the controller 120 may read the baseline signature from the active IR sensor 142 and compare that baseline signature to a predetermined threshold. The predetermined threshold may be an intensity level or other level at which the active IR sensor 142 is most sensitive. For example, the predetermined threshold may be below saturation of the ADC 150. In some embodiment, the predetermined threshold may include a range of allowed values.

In block 318, the pest control device 102 checks whether the baseline signature is at the predetermined threshold. If so, the method 300 branches ahead to block 322, described below. If the baseline signature is not at the threshold, the method 300 advances to block 320, in which the pest control device 102 adjusts the intensity of the IR emitters 146 toward the threshold level. For example, if the baseline signature is too high, the pest control device 102 may reduce IR emitter 146 intensity, and if the baseline signature is too low, the pest control device 102 may increase the IR emitter 146 intensity. To adjust the IR emitter 146 intensity, the controller 120 may, for example, configure the IR driver current, pulse time, or other settings of the active IR sensor 142. After adjusting the IR emitter 146 intensity, the method 300 loops back to block 304 to continue calibrating the IR emitters 146. Thus, the pest control device 102 may automatically adjust the IR emitters 146 without requiring manual intervention.

Referring back to block 318, if the baseline signature is at the predetermined level, the method 300 branches to block 322, in which the pest control device 102 programs the active IR sensor 142 with high and low thresholds based on the measured baseline. As described further below in connection with FIGS. 4 and 5, the high and low thresholds define a window for measured IR signatures that may be used to detect pests. The window may be relative to the baseline signature of the environment of the pest control device 102. The controller 120 may configure the active IR sensor 142 with the thresholds using the control interface 152. For example, the controller 120 may write the high threshold and the low threshold to corresponding registers of the control interface 152. In some embodiments, the high and low thresholds may be configurable, for example by one or more configuration commands received via the NFC circuitry 134 from a mobile communication device (e.g., a smartphone).

In some embodiments, in block 324 the pest control device 102 may filter or adapt the high and low thresholds based on previous baseline signatures. Thus, the pest control device 102 may gradually change the baseline based on changes in measured baseline over time. For example, the pest control device 102 may adapt thresholds based on environment changes such as lighting cycles, lenses that become dirty over time, changing reflectance of surfaces in the environment (e.g., as surfaces are soiled), and other changes over time. In those embodiments, the pest control device 102 may store one or more previous baseline signatures and/or high and low thresholds. After programming the active IR sensor 142, the method 300 advances to block 326, in which the method 300 stops. The pest control device 102 may now begin actively monitoring the monitored space for pests as described below in connection with FIGS. 4-6.

Figure 4:
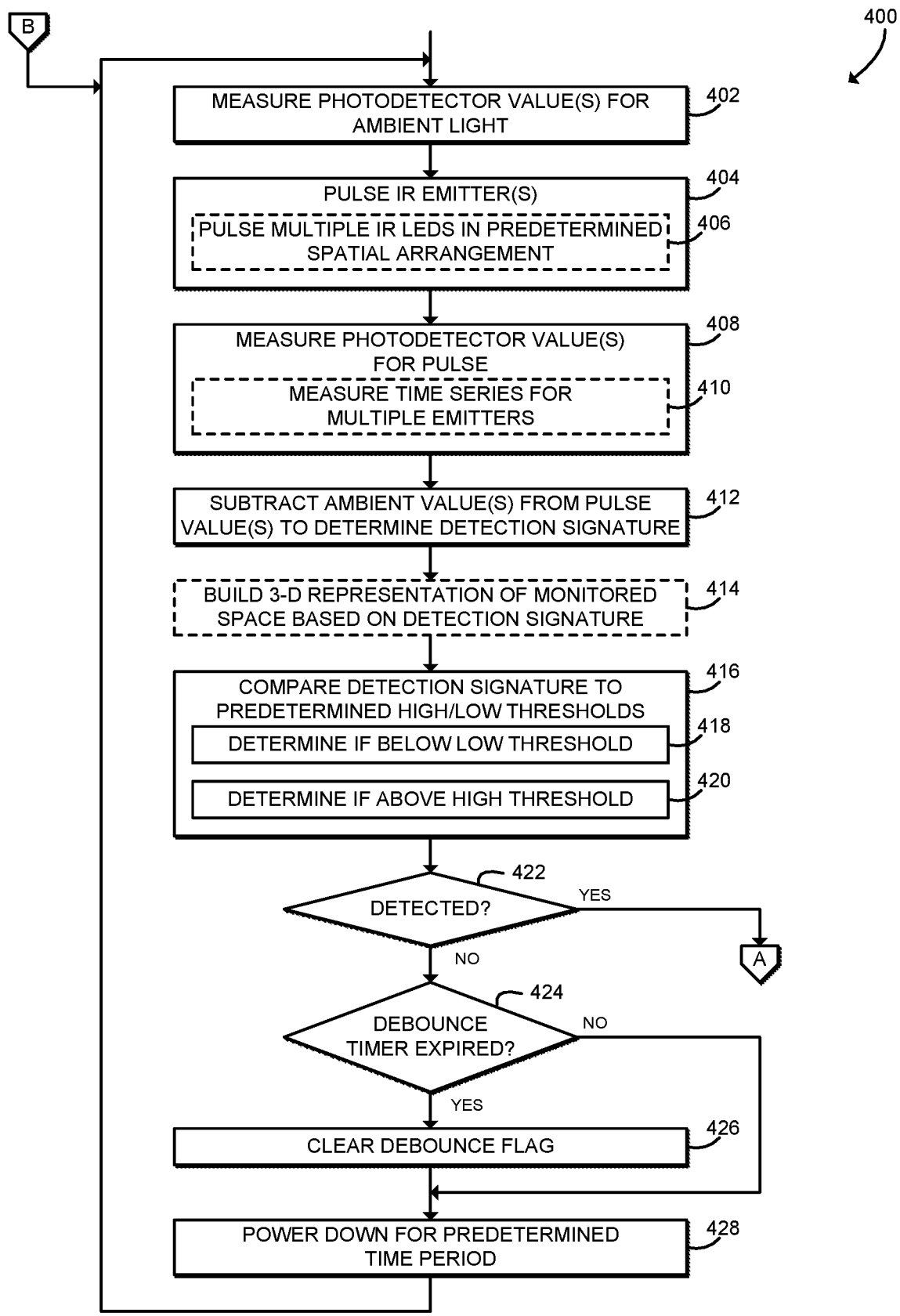
FIGS. 4 and 5 are a simplified flow diagram of at least one embodiment of a method for pest detection that may be executed by the pest control device of FIGS. 1-2.
Figure 5:
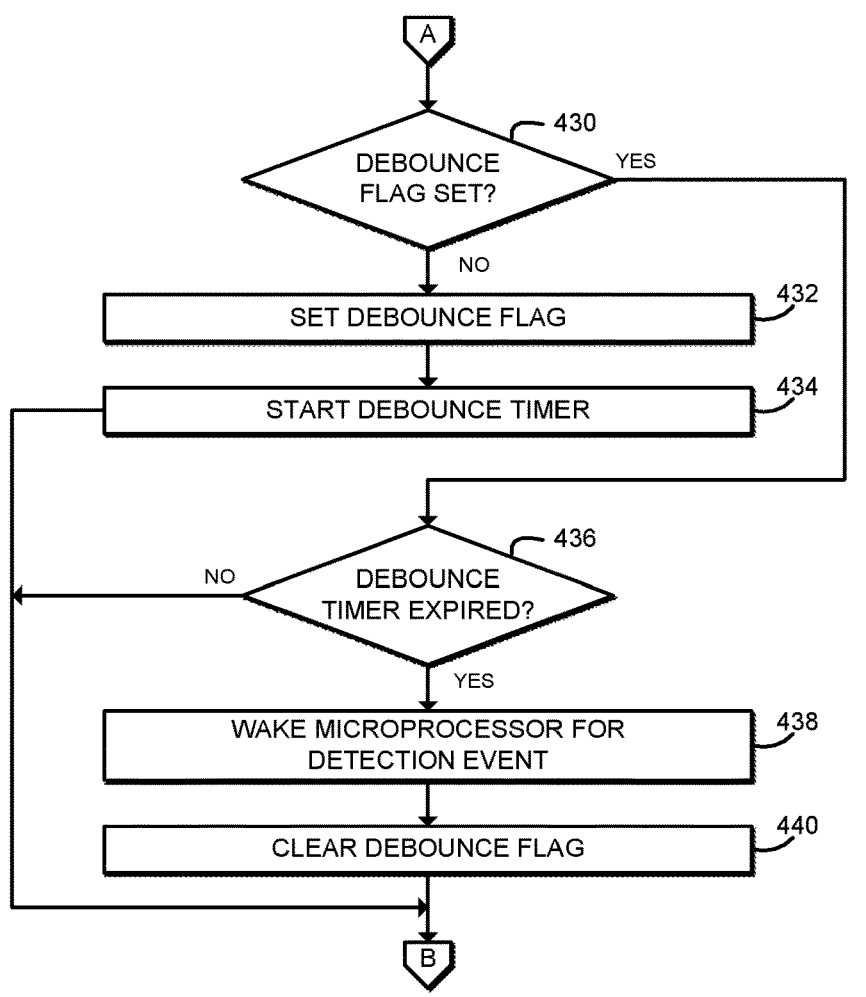

Referring now to FIGS. 4 and 5, in use, the pest control device 102 may execute a method 400 for pest detection. It should be appreciated that, in some embodiments, the operations of the method 400 may be performed by one or more components of the environment 200 of the pest control device 102 as shown in FIG. 2, such as the active IR sensor 142. The method 400 begins in block 402, in which the pest control device 102 measures photodetector 148 values for ambient light in the environment of the pest control device 102. The ambient light is measured without activating the IR emitters 146. The ambient light values may be read autonomously by the active IR sensor 142. As described further below in connection with FIG. 6, the controller 120 may be in a low-power mode while the active IR sensor 142 autonomously measures the environment.

Figure 13:
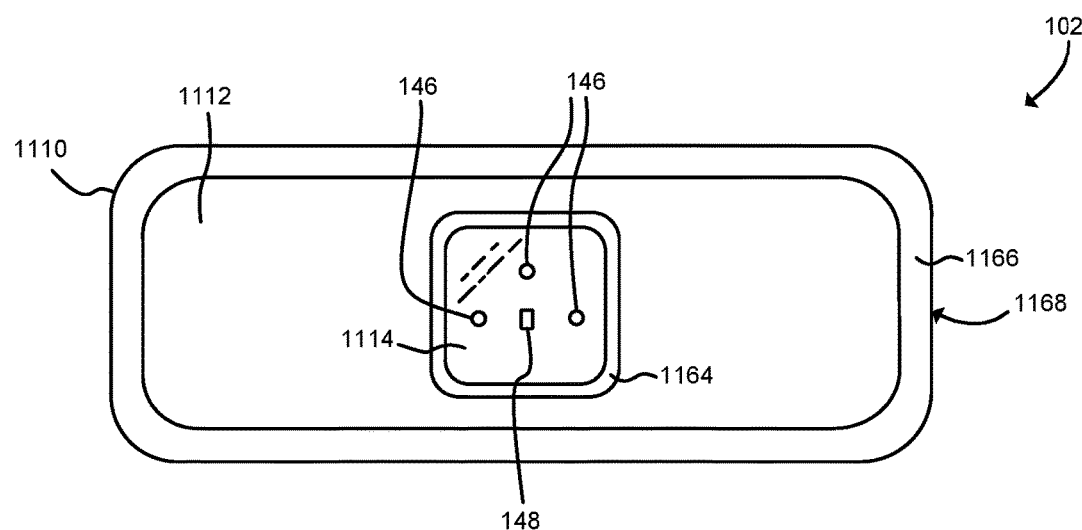
FIG. 13 is a bottom view of an embodiment of the pest control device of FIG. 11.
Figure 17:
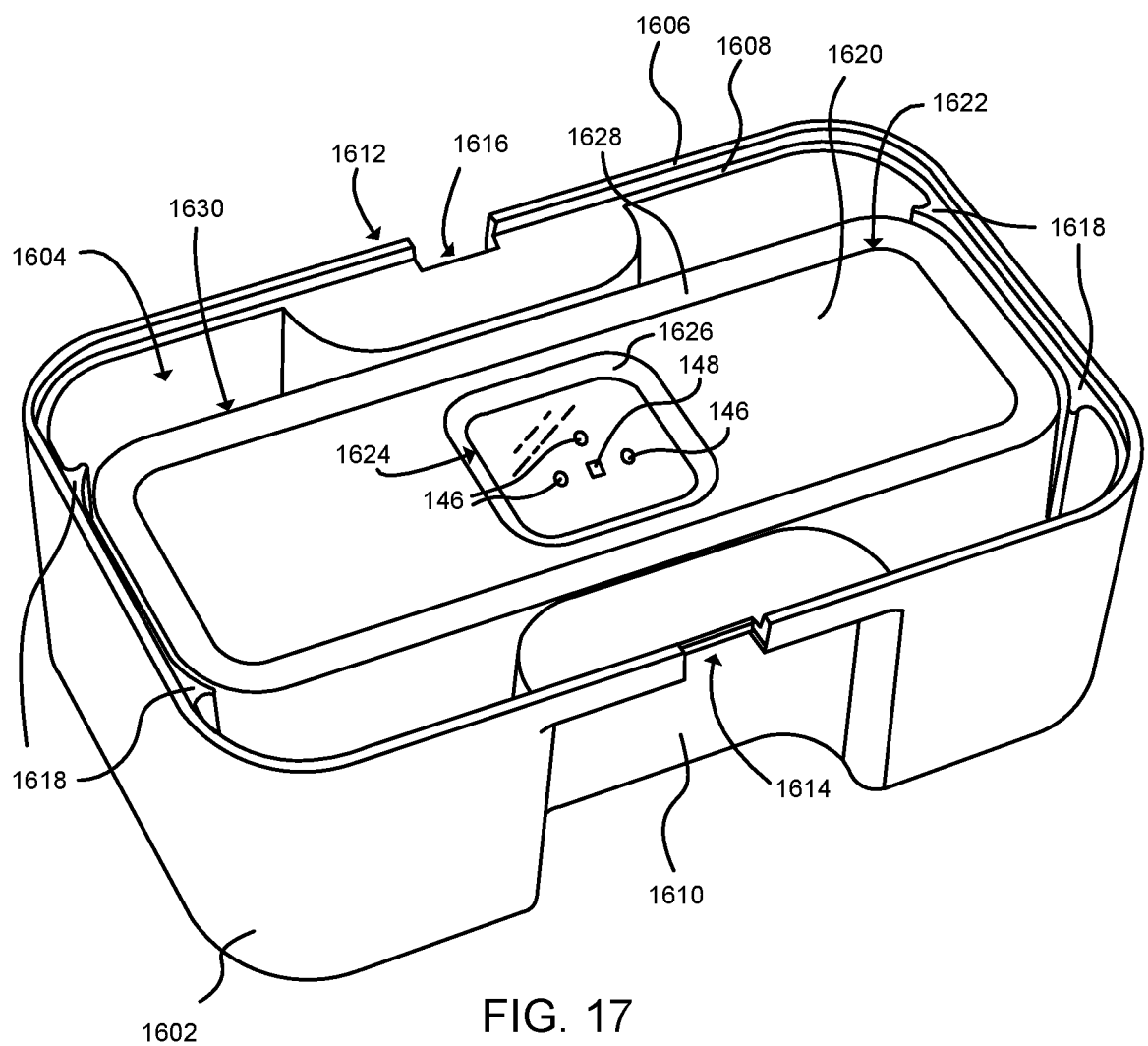
FIG. 17 is a bottom view of a cover including inserted pest control device of the pest control station of FIG. 16.

In block 404, the active IR sensor 142 of the pest control device 102 pulses the IR emitters 146. Pulsing the IR emitters 146 illuminates the monitored space with IR light. As described above in connection with FIG. 3, the intensity of the IR pulse may have been previously configured based on the environment of the pest control device 102. The IR light may reflect from objects in the monitored space and/or may be absorbed by objects in the monitored space. In some embodiments, in block 406 the pest control device 102 may pulse multiple IR LEDs 146 that are positioned in a predetermined spatial arrangement. For example, the IR LEDs 146 may be positioned apart from each other in an "L" arrangement as shown in FIG. 7. As another example, the IR LEDs 146 may be positioned apart from each other in a triangular arrangement as shown in FIGS. 13 and 17. In those embodiments, the IR LEDs 146 may be pulsed in sequence.

In block 408, the active IR sensor 142 of the pest control device 102 measures photodetector 148 values associated with the IR pulse. The pulse value measures the amount of ambient IR light in the environment as well as the IR light emitted from the IR emitters 146 that is reflected off of objects in the environment back to the photodetectors 148. In some embodiments, in block 410 the pest control device 102 may measure a time series of photodetector 148 values. For example, when multiple IR LEDs 146 are pulsed in sequence, the pest control device 102 may measure the received IR light over time. As described above in connection with block 402, the photodetector 148 values may be measured by the active IR sensor 142 autonomously from the controller 120.

In block 412, the active IR sensor 142 of the pest control device 102 subtracts the ambient IR light values from the pulse IR light values to determine a detection signature for the environment of the pest control device 102. The detection signature is indicative of the IR reflectance of objects currently in the environment of the pest control device 102 and thus may indicate whether pests are present.

In some embodiments, in block 414 the pest control device 102 may construct a three-dimensional representation of the monitored space based on the detection signature. For example, the pest control device 102 may analyze a time series of multiple infrared pulses that were generated by multiple IR LEDs 146 that are arranged in a predetermined pattern. By comparing the detection signature associated with each IR LED 146, the pest control device 102 may identify objects and/or motion within the monitored space. In some embodiments, the three-dimensional representation may be constructed by the controller 120 or by the active IR sensor 142.

In block 416, the active IR sensor 142 of the pest control device 102 compares the detection signature to a predetermined high threshold and a predetermined low threshold. Thus, the pest control device 102 determines whether the detection signal is outside of a window established around the baseline signature. The detection signature is indicative of the amount of emitted IR light that is reflected or absorbed by objects in the environment of the pest control device 102. By comparing the detection signature to the window established around the baseline signature, the pest control device 102 thus determines whether objects currently in the environment (including potential pests, such as rodents or insects) reflect or absorb different amounts of IR light as compared to the baseline environment. The comparison to the high and low thresholds may be performed by the active IR sensor 142 autonomously from the controller 120.

In block 418, the active IR sensor 142 determines if the detection signature is below (e.g., less than, less than or equal to, etc.) the predetermined low threshold. The detection signature may be below the low threshold, for example, if a relatively dark pest is located in the monitored space and the dark pest absorbs more IR light than the background environment. As another example, the detection signature may be below the low threshold when the background environment is highly reflective (e.g., the interior of a shiny metallic pest control station) and the pest absorbs more IR light than the environment. In block 420, the active IR sensor 142 determines if the detection signature is above (e.g., greater than, greater than or equal to, etc.) the predetermined high threshold. The detection signature may be above the high threshold, for example, if a relatively light pest is located in the monitored space and the light pest reflects more IR light than the background environment. As another example, the detection signature may be above the high threshold when the background environment is dark or highly light-absorbent (e.g., the interior of a dark, plastic pest control station) and the pest reflects more IR light than the environment. Continuing that example, many insects such as cockroaches reflect more IR light than the environment (e.g., the interior of a dark pest control station as described below in connection with FIGS. 9-18).

Although illustrated as comparing the detection signature to both a low threshold and a high threshold, it should be understood that in some embodiments, the IR sensor 142 may compare the detection signature to a single threshold. For example, in some embodiments, the active IR sensor 142 may compare the detection signature to a high threshold and may not compare the detection signature to a low threshold.

In block 422, the pest control device 102 checks whether a pest was detected (i.e., whether the detection signature was outside the predetermined window). If not, the method 400 proceeds to block 424, described further below. If a pest was detected, the method 400 branches to block 430, shown in FIG. 5.

Referring now to FIG. 5, in block 430 the active IR sensor 142 of the pest control device 102 determines whether a debounce flag has been set. The debounce flag may be embodied as a register, bit, or other state of the active IR sensor 142 and is initially cleared. If the debounce flag is set, the method 400 branches ahead to block 436, described below. If the debounce flag is not set, the method 400 advances to block 432, in which the active IR sensor 142 of the pest control device 102 sets the debounce flag. In block 434, the active IR sensor 142 of the pest control device 102 starts a debounce timer. The debounce timer is set for a time that is long enough to avoid false positives while short enough to detect a pest in the monitored space. Illustratively, for the detection of rodents or insects such as cockroaches the debounce timer is set to elapse after 500 milliseconds. In some embodiments, the length of the debounce timer may be configurable. For example, the debounce timer may be set for a shorter time in order to detect faster motion in the monitored space. As another example, the debounce timer may be set for a longer time in order to detect larger animals. After setting the debounce timer, the method 400 loops back to block 402, shown in FIG. 4, to continue active IR monitoring of the monitored space.

Referring back to block 430, if the debounce flag is set, the method 400 branches to block 436. In block 436, the active IR sensor 142 of the pest control device 102 determines whether the debounce timer has expired. As described above, the debounce flag and the debounce timer are set when an initial detection occurs. If the debounce timer has not expired (e.g., less than 500 milliseconds have elapsed the initial detection), the method 400 loops back to block 402, shown in FIG. 4, to continue active IR monitoring of the monitored space. If the debounce timer has expired (e.g., more than 500 milliseconds have elapsed since initial detection and the signal is still detected), the method 400 advances to block 438.

In block 438, the active IR sensor 142 of the pest control device 102 wakes the controller 120 for a pest detection event. For example, the active IR sensor 142 may assert an interrupt to the microprocessor 122 or other component of the controller 120. The controller 120 may perform one or more pest control actions as described further below in connection with FIG. 6. After waking the controller 120, the method 400 proceeds to block 440, in which the active IR sensor 142 of the pest control device 102 clears the debounce flag. After clearing the debounce flag, the method 400 loops back to block 402, shown in FIG. 4, to continue active IR monitoring of the monitored space.

Referring back to block 422 shown in FIG. 4, if the detection signature is not outside the predetermined window, the method 400 advances to block 424. In block 424, the active IR sensor 142 of the pest control device 102 determines whether the debounce timer has expired. As described above, the debounce timer may be started in response to initial detection of a potential pest. If the debounce timer has not expired, the method 400 branches to block 428, described below. If the debounce timer has expired (e.g., more than 500 milliseconds have elapsed since initial detection and the signal is no longer detected), the method 400 advances to block 426, in which the active IR sensor 142 of the pest control device 102 clears the debounce flag. After clearing the debounce flag, the method 400 advances to block 428.

In block 428, the active IR sensor 142 of the pest control device 102 powers down for a predetermined time. The power down time may be configurable or otherwise adjustable to balance power consumption with detection frequency. Illustratively, the active IR sensor 142 may power down for two seconds, meaning that the active IR sensor 142 measures the active IR signature every two seconds. This power down period may allow the pest control device 102 to achieve long battery life with acceptable detection frequency. In some embodiments, the power down time may be reduced to increase detection frequency, for example when a pest has been potentially detected and the debounce timer has not expired, when a pest has been detected, or in other circumstances. After powering down for the predetermined time period, the active IR sensor 142 may resume ordinary operations. The method 400 loops back to block 402 to continue active IR monitoring of the monitored space.

Figure 6:
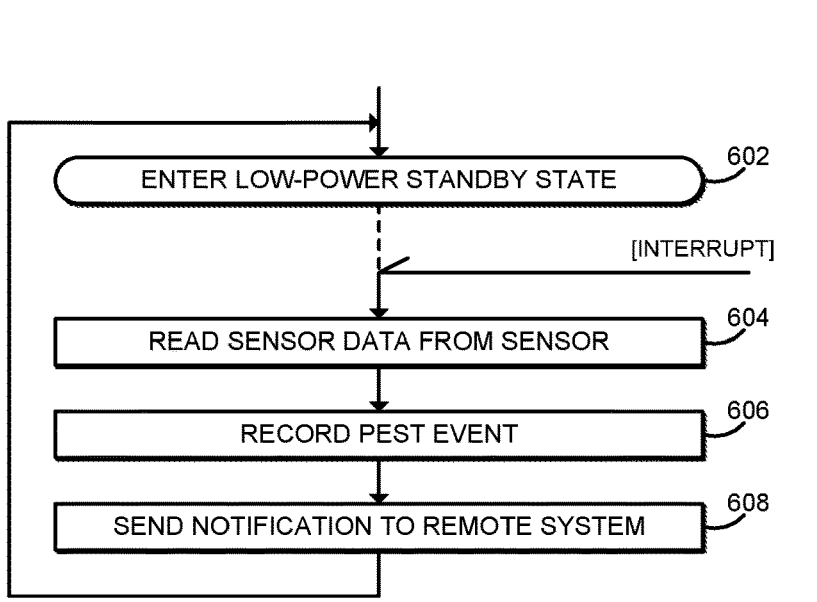
FIG. 6 is a simplified flow diagram of at least one embodiment of a method for pest detection response that may be executed by the pest control device of FIGS. 1-2.

Referring now to FIG. 6, in use, the pest control device 102 may execute a method 600 for pest detection response. It should be appreciated that, in some embodiments, the operations of the method 600 may be performed by one or more components of the environment 200 of the pest control device 102 as shown in FIG. 2, such as the controller 120. The method 600 begins in block 602, in which the pest control device 102 enters a low-power state. The pest control device 102 may cause the controller 120 to enter a sleep, standby, or other low-power state. While the controller 120 is in the low-power state, the active IR sensor 142 may autonomously perform active IR monitoring of the monitored space as described above in connection with FIGS. 4 and 5. The controller 120 may remain in the low-power state until receiving an interrupt from the active IR sensor 142. In response to the interrupt, full-power operation of the controller 120 is resumed, and the method 600 advances to block 604.

In block 604, the pest control device 102 may read sensor data from the active IR sensor 142. The pest control device 102 may, for example, read IR signature data using the control interface 152 of the active IR sensor 142. In block 606, the pest control device 102 may record a pest event in the data storage device 126 or other non-volatile storage of the pest control device 102. That pest event data may be read at a later time, for example via the NFC circuitry 134 using a mobile computing device (e.g., a smartphone). In block 608, the pest control device 102 may send a notification to the remote system 104. The pest control device 102 may, for example, send the notification via a long-range low-power wireless link using the LoRa circuitry 132. The remote system 104 may make the pest event data available, for example via a web portal or other remote interface. After performing a pest control action as described above, the method 600 loops back to block 602, in which the pest control device 102 re-enters the low-power state. The pest control device 102 may be re-awakened in response to future detection events.

Referring now to FIG. 7, a perspective view of the pest control device 102 is shown. As shown in FIG. 7, the pest control device 102 includes a casing 700 that protects interior, electrical components such as the controller 120, the communication subsystem 128, and the active IR sensor 142. The casing 700 is illustratively formed from a plastic material that protects the electrical components from environmental factors, including water ingress, dust, dirt, leaves, humidity, and waste. It should be appreciated that in other embodiments other materials may be used in the casing 700. It should be appreciated that the sizing of the casing 700 (and hence the pest control device 102) may depend on, for example, the nature of the pest and the monitoring environment.

As shown in FIG. 7, the IR LEDs 146 and photodiodes 148 extend through the casing 700, allowing access to the environment surrounding the pest control device 102. In some embodiments, the IR LEDs 146 and/or the photodiodes 148 may be positioned behind lenses, windows, or other parts of the casing 700 that are transparent to IR light. In the illustrative embodiment, the pest control device 102 includes three IR LEDs 146 that are positioned in an "L" pattern on a front wall 702 of the casing 700. As described above, with the IR LEDs 146 in this predetermined "L" pattern, the IR response may be used to construct a three-dimensional representation of the monitored space. As shown, the photodiodes 148 are also positioned on the front wall 702 to detect reflected IR light that was originally emitted from the IR LEDs 146. Of course, the photodiodes 148 may also detect ambient light from the environment of the pest control device 102.

As shown, the antenna 130 extends outwardly from a rear wall 704 of the casing 700. The antenna 130 is connected at its base to the pest control device 102. In some embodiments, the pest control device 102 may be disconnected from the antenna 130, and in other embodiments, the pest control device 102 and the antenna 130 may be formed as a single unit. In some embodiments, one or more antennas 130 (e.g., an NFC loop antenna) may be included inside the casing 700 of the pest control device 102.

The illustrative pest control device 102 shown in FIG. 7 may be used as a space monitor and positioned directly in a runway, a ceiling, a residential or commercial space, or other location to monitor for the presence of pests. In those embodiments, reports from the pest control device 102 may indicate the presence and/or frequency of presence of pests in the monitored space rather than indicating that a pest has been detained or exterminated. Additionally or alternatively, as illustrated below in FIG. 8, in some embodiments the pest control device 102 may be included in a live multi-catch trap, a baiting station, or other rodent control station. Further, as illustrated below in FIGS. 9-18, in some embodiments the pest control device 102 may be included in an insect control station.

Figure 8:
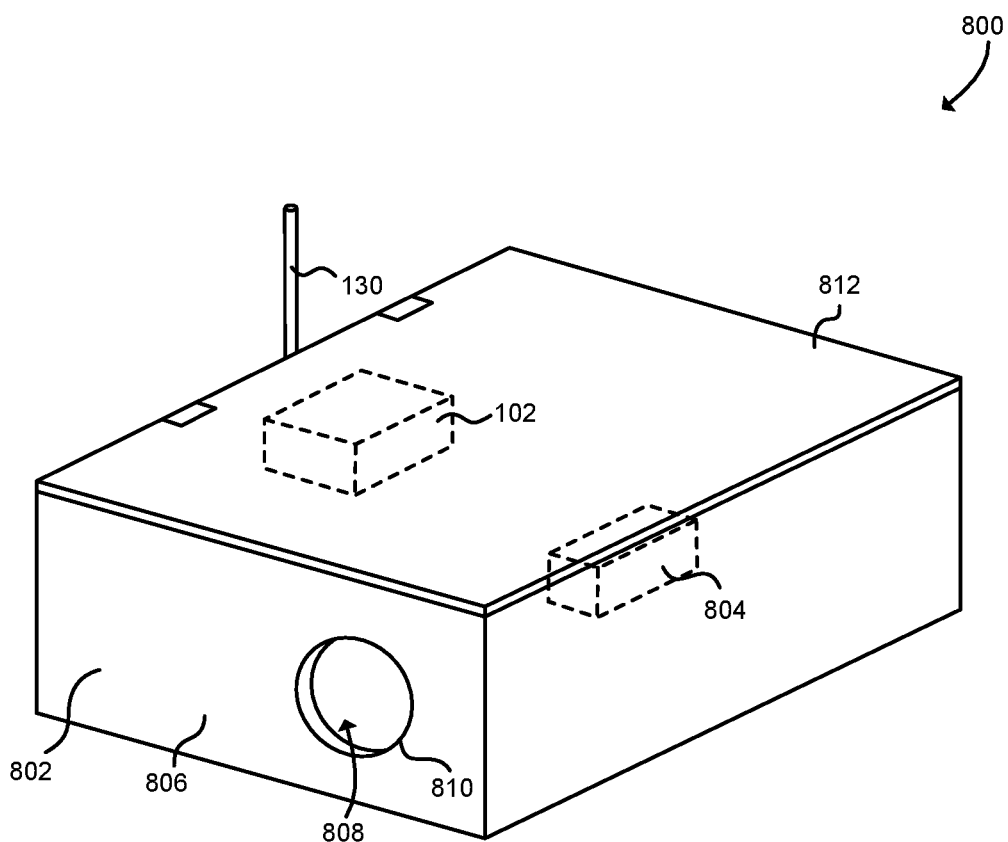
FIG. 8 is a perspective view of a pest control station that includes the pest control device of FIGS. 1-2.

Referring now to FIG. 8, a perspective view of a rodent control station 800 is shown. The illustrative station 800 includes a housing 802 and a pest control device 102 positioned in the housing 802. The station 800 also includes bait 804 in the form of a pest-consumable material. In some embodiments, the pest-consumable material may include a rodenticide. In other embodiments, the bait 804 may be a lure or other pest-attracting material. In still other embodiments, the station 800 may not include bait. In other embodiments, the station 800 may also include a trap that detains and/or exterminates the rodent.

The housing 802 is illustratively formed from a hard, durable plastic, but, in other embodiments, it may be formed from metal or any environmentally resistant material. The housing 802 of the station 800 includes multiple outer walls 806 that define an inner chamber 808. The pest control device 102 and the bait 804 are positioned in the chamber 808. In the illustrative embodiment, a rodent may enter the station 800 through a circular opening 810 defined in each opposite wall 806.

In the illustrative embodiments, the pest control device 102 is configured to monitor the interior of the chamber 808. As described above, the pest control device 102 illuminates the chamber 808 with the IR LEDs 146 and measures the IR response signature with the photodiodes 148. As described above, changes in the IR signature may indicate that a rodent has entered the chamber 808. The pest control device 102 may report the presence of rodents in the chamber 808 to the remote system 104 via the antenna 130. As shown, in the illustrative embodiment, the antenna 130 extends through the outer walls 806 to the exterior of the station 800. In some embodiments, the chamber 808 may be further subdivided into additional passages or chambers. In those embodiments, the pest control device 102 may be positioned within the chamber 808 so as to illuminate the entrance/exit or other predetermined spaces within the chamber 808.

The station 800 also includes a cover 812 that is hinged to the housing 802. The cover 812 is illustratively formed from the same material as the housing. The cover 812 is movable between the closed position shown in FIG. 8 and an open position (not shown) in which the chamber 808, and hence the pest control device 102 and the bait 804, are accessible for maintenance or other servicing. It should be appreciated that in other embodiments the cover 812 may be removable from the housing 802. In still other embodiments, the cover 812 may be omitted from the station 800.

Figure 9:
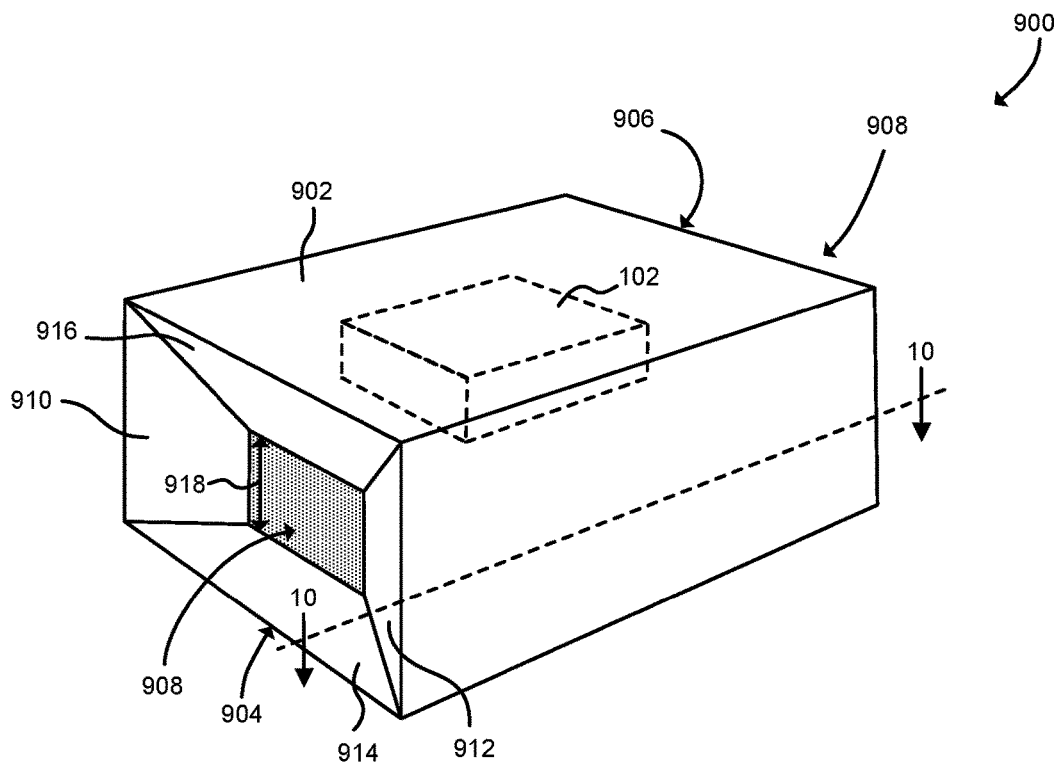
FIG. 9 is a perspective view of another pest control station that includes the pest control device of FIGS. 1-2.
Figure 10:
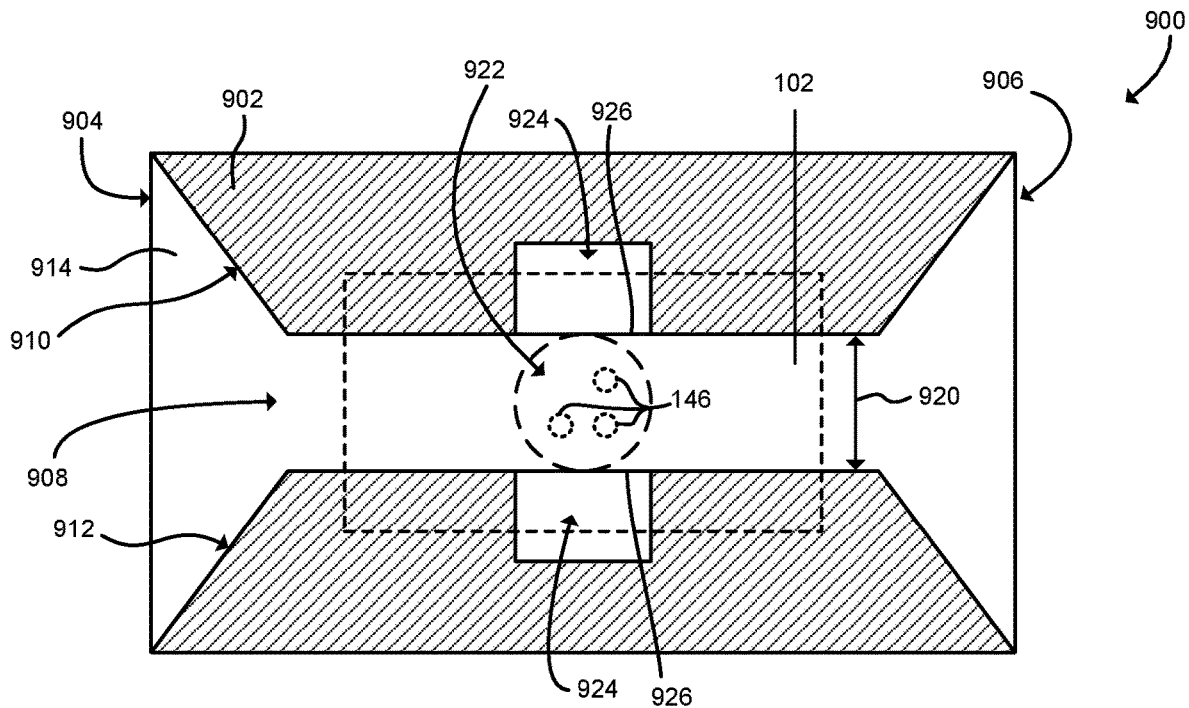
FIG. 10 is a section view of the pest control station of FIG. 9.
Figure 11:
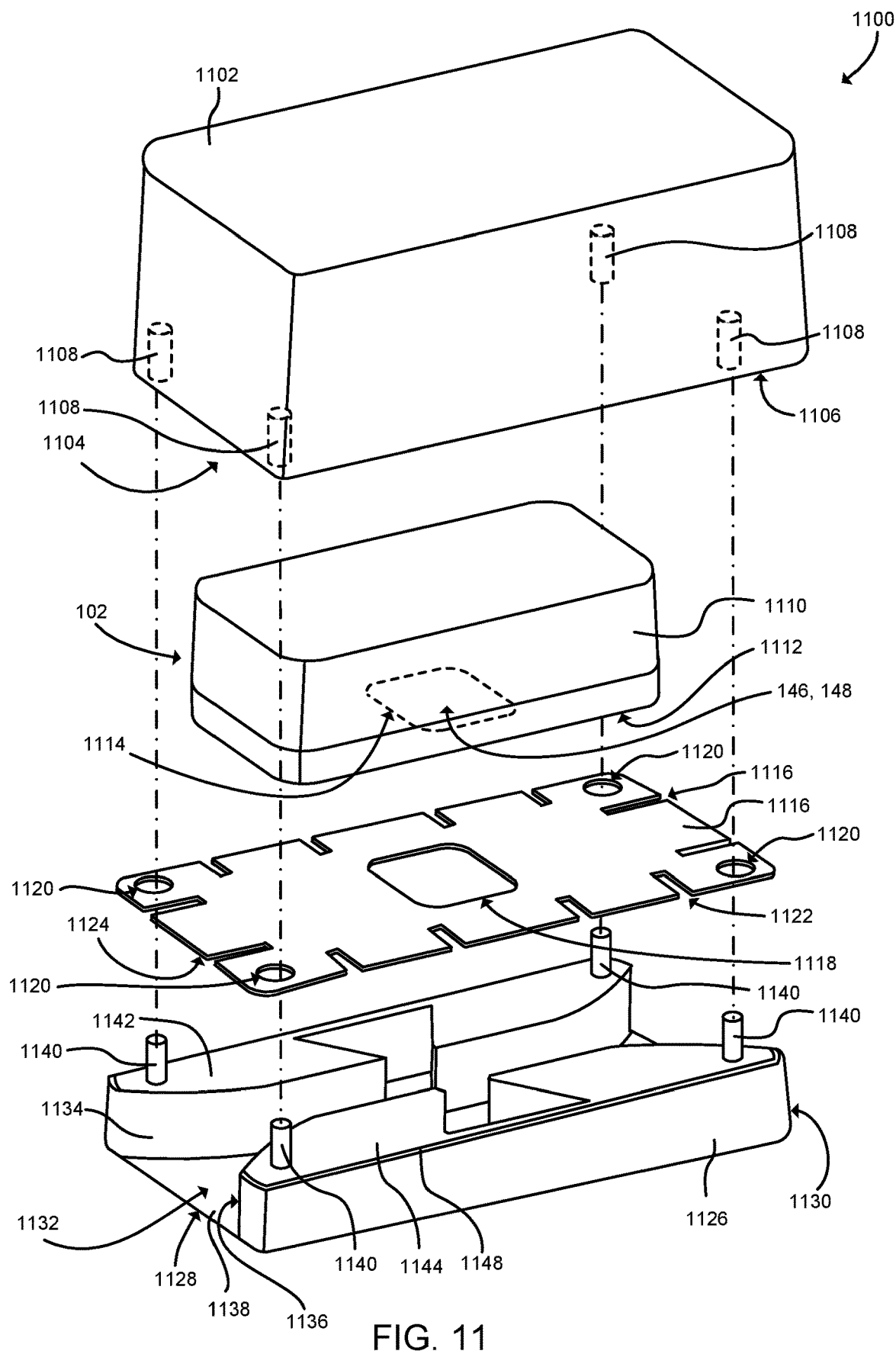
FIG. 11 is an exploded view of another embodiment of a pest control station that includes the pest control device of FIGS. 1-2.

Referring now to FIGS. 9 and 10, an insect control station 900 is shown. The illustrative station 900 includes a housing 902 and a pest control device 102 positioned in the housing 902. The housing 902 is illustratively formed from a hard, durable plastic, but, in other embodiments, it may be formed from metal or any environmentally resistant material. As described further below, the housing 902 may be dark in color in order to absorb ambient light and improve insect detection.

The housing 902 includes a pair of openings 904, 906 on either end of the housing. The openings 904, 906 are in communication with a passage 908 that extends through the interior of the housing 902. Each of the openings 904, 906 are defined by side walls 910, 912, a floor 914, and a ceiling 916. The walls 910, 912, floor 914, and/or ceiling 916 may be angled and/or curved such that each of the openings 904, 906 narrow into the passage 908. In use, as described further below, insects such as cockroaches may crawl into the passage 908 through either of the openings 904, 906. In some embodiments, the floor 914 may be flat and/or may form a ramp to allow cockroaches to enter the passage 908.

As best shown in FIG. 9, the passage 908 has a height 918 that is defined between the floor 914 and the ceiling 916 within the passage 908. Similarly, as best shown in FIG. 10, the passage 908 has a width 920 that is defined between the walls 910, 912 within the passage 908. The height 918 and the width 920 are sized to be large enough to allow a particular type of insect to enter the passage 908 and also to be small enough to encourage the insect to remain toward the center of the passage 908, as described further below. For example, to detect American cockroaches and/or German cockroaches, the height 918 may be about 17 millimeters, and the width 920 may be about 17 millimeters. At those dimensions, the passage 908 is large enough to accommodate American cockroaches while still providing good detection of smaller German cockroaches.

As best shown in FIG. 10, the pest control device 102 is positioned above the passage 908. The IR LEDs 146 of the pest control device 102 are configured to illuminate the interior of the passage 908. For example, the IR LEDs 146 may be included on a bottom surface of the pest control device 102, and may illuminate the passage 908 through a window or other opening in the ceiling 916 of the passage 908. As described above, the pest control device 102 illuminates the passage 908 with the IR LEDs 146 and measures the IR response signature with the photodiodes 148. As shown, the IR LEDs illuminate an optimal sensing zone 922 of the passage 908. As described above, transients or other changes in the IR signature may indicate that a cockroach has entered the passage 908. The pest control device 102 may report the presence of insects in the passage 908 to the remote system 104 via the antenna 130. The pest control device 102 may perform best for detecting insects within the optimal sensing zone 922. For example, a change in IR signature compared to a baseline signature may be greatest when an insect is in the optimal sensing zone 922 as compared to elsewhere within the passage 908 and/or elsewhere within the station 900.

The illustrative optimal sensing zone 922 extends between the walls 910, 912 of the passage 908. Cockroaches, as well as many other insects and other types of animals, tend to prefer to follow along walls when entering a space. Thus, by narrowing the openings 904, 906 into the passage 908, the walls 910, 912 may guide cockroaches into the optimal sensing zone 922. Similarly, the floor 914 and ceiling 916 may narrow to guide cockroaches into the optimal sensing zone 922. Additionally, the narrowing walls 910, 912, floor 914, and/or ceiling 916 may block or otherwise prevent some or all ambient light from entering the passage 908. Cockroaches tend to prefer dark places, and thus may be encouraged to enter the passage 908 as it may be darker than its surroundings. Additionally, blocking ambient light may improve detection performance of the pest control device 102. Blocking ambient light and other improvements to detection performance may also provide improved resistance to false detections caused by environmental disturbances (e.g., disturbances such as changes in ambient light, movement of the station 900, shock, vibrations, or other disturbances).

As best shown in FIG. 10, the housing may also include bait chambers 924 positioned adjacent to the optimal sensing zone 922 of the passage 908. Each bait chamber 924 is separated from the passage 908 by an opening 926, which may be embodied as a window, partial wall, or other opening that allows cockroaches to access bait in the bait chamber 924 but not enter the bait chamber 924. Each bait chamber 924 may be filled with bait in the form of food or other pest-consumable material, a lure, or other pest-attracting materials. Bait located in the bait chambers 924 may encourage cockroaches to enter the passage 908 and to remain in the optimal sensing zone 922. Of course, in some embodiments, the station 900 may not include bait.

Referring now to FIGS. 11-14, an embodiment of an insect control station 1100 is shown. As shown in exploded view in FIG. 11, the insect control station 1100 includes a top cover 1102, a pest control device 1110, an insert 1116, and a base 1126. The top cover 1102 includes an interior volume 1104 surrounded by a bottom edge 1106. The interior volume 1104 is sized to receive the pest control device 1110. In some embodiments, the interior volume 1104 may include ribs or other projections (not shown) that engage the outer casing of the pest control device 1110. The interior volume 1104 illustratively also includes four lugs 1108.

The pest control device 1110 may be embodied as a pest control device 102 and thus includes one or more IR LEDs 146 and photodiodes 148. The pest control device 1110 includes an outer casing that protects interior, electrical components such as the controller 120, the communication subsystem 128, and the active IR sensor 142. The casing is illustratively formed from a plastic material that protects the electrical components from environmental factors, including water ingress, dust, dirt, leaves, humidity, and waste. The illustrative pest control device 1110 includes an internal antenna 130 within the casing that allows for communication with the remote system 104. As described above, the pest control device 1110 is received in the interior volume 1104 of the top cover 1102. The outer casing of the pest control device 1110 may engage one or more ribs or other projections of the top cover 1102 inside the interior volume 1104.

As shown, the pest control device 1110 includes a bottom surface 1112. The bottom surface 1112 includes window 1114, which may be embodied as transparent plastic or other material that is transparent to IR light and in some embodiments visible light. As best shown in FIG. 13, the IR LEDs 146 and the photodiodes 148 are positioned within the pest control device 1110 behind the window 1114, allowing access to the environment surrounding the pest control device 1110. In the illustrative embodiment, the pest control device 102 includes three IR LEDs 146 that are positioned in a triangular pattern behind the window 1114. In some embodiments, the pest control device 1110 may activate only one of the IR LEDs 146 in order to reduce power consumption. As best shown in FIG. 13, the window 1114 may be recessed within the bottom surface 1112 by a beveled surround 1164. Similarly, the bottom surface 1112 may be recessed by a beveled surround 1166 from an outer edge 1168 of the pest control device 1110.

The insert 1116 includes a central opening 1118, four through holes 1120, multiple slots 1122, and a bottom surface 1124. The insert 1116 is sized to fit within the interior volume 1104 of the top cover 1102 along the bottom edge 1106. Each of the slots 1122 may be sized and positioned to receive a rib or other projection of the top cover 1102. The central opening 1118 is positioned below the window 1114 of the pest control device 1110. In some embodiments, the central opening 1118 may be surrounded by a boss or other projection (not shown) that engages the surround 1164 of the pest control device 1110.

The base 1126 includes a pair of openings 1128, 1130 on either end of the base 1126. The openings 1128, 1130 are in communication with a passage 1132 that extends through the interior of the base 1126. When assembled, each of the openings 1128, 1130 are defined by side walls 1134, 1136 and a floor 1138 of the base 1126, as well as the bottom surface 1124 of the insert 1116. The walls 1134, 1136 and/or floor 1138 may be angled and/or curved such that each of the openings 1128, 1130 narrow into the passage 1132. In use, as described further below, insects such as cockroaches may crawl into the passage 1132 through either of the openings 1128, 1130. In some embodiments, the floor 1138 may be flat and/or may form a ramp to allow cockroaches to enter the passage 1132.

As discussed above in connection with FIGS. 9-10, the passage 1132 has a height that is defined between the floor 1138 and the surface 1124 within the passage 1132 as well as a width that is defined between the walls 1134, 1136 within the passage 1132. In the illustrative station 1100, the height and the width are each about 17 millimeters, which may allow detection of American cockroaches and/or German cockroaches.

Figure 12:
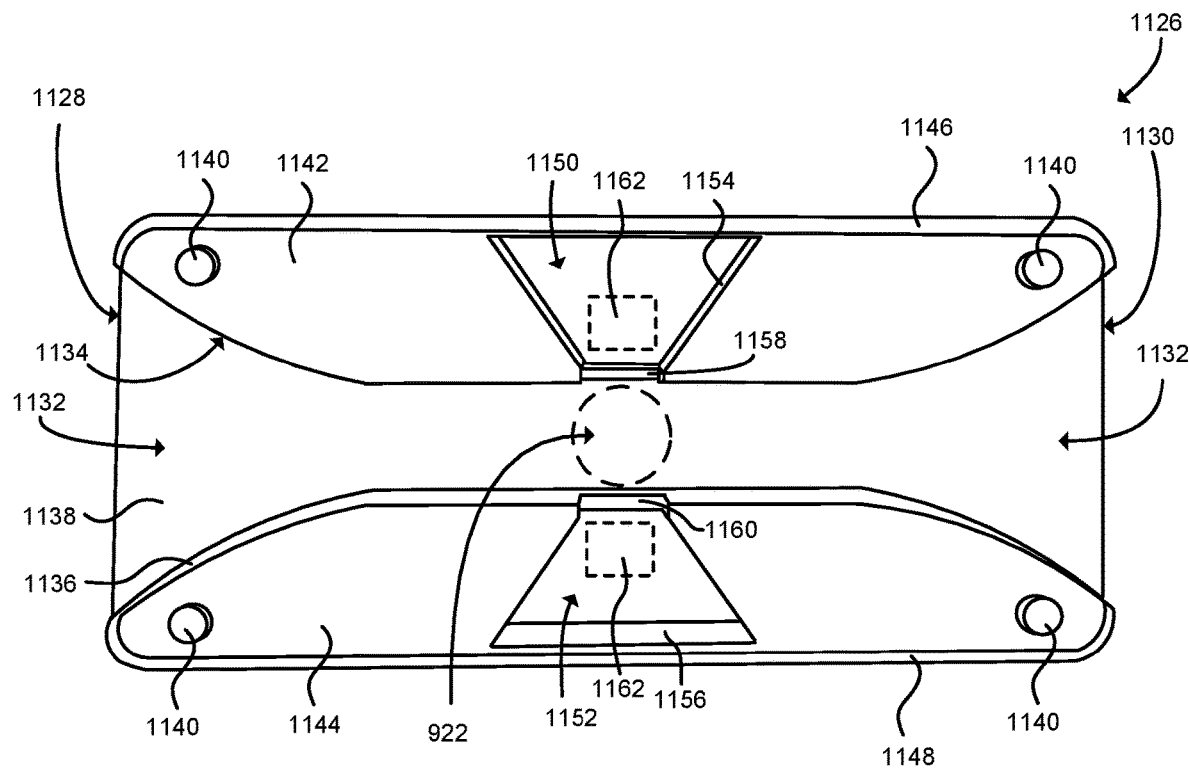
FIG. 12 is a top view of a base of the pest control station of FIG. 11.

As best shown in FIG. 12, the optimal sensing zone 922 covers part of the passage 1132. When assembled, the pest control device 1110 is positioned above the optimal sensing zone 922 of the passage 1132. As described above, the IR LEDs 146 of the pest control device 1110 are configured to illuminate the interior of the passage 1132 through the window 1114 of the pest control device 1110 and the opening 1118 of the insert 1116. As described above, the pest control device 1110 illuminates the passage 1132 with the IR LEDs 146 and measures the IR response signature with the photodiodes 148. As described above, changes in the IR signature may indicate that a cockroach has entered the passage 1132. The pest control device 102 may report the presence of insects in the passage 1132 to the remote system 104 via the antenna 130. The pest control device 1110 may perform best for detecting insects that are located within the optimal sensing zone 922.

The illustrative optimal sensing zone 922 extends between the walls 1134, 1136 of the passage 1132. Cockroaches, as well as many other insects and other types of animals, tend to prefer to follow along walls when entering a space. Thus, by narrowing the openings 1128, 1130 into the passage 1132, the walls 1134, 1136 may guide cockroaches into the optimal sensing zone 922. Similarly, when assembled the floor 1138 may raise toward the surface 1124 to guide cockroaches into the optimal sensing zone 922.

As best shown in FIG. 12, the base 1126 includes a pair of bait chambers 1150, 1152 positioned adjacent to the optimal sensing zone 922 of the passage 1132. Each bait chamber 1150, 1152 is defined by a respective internal wall 1154, 1156 and is separated from the passage 1132 by a respective partial wall 1158, 1160. When assembled, each partial wall 1158, 1160 cooperates with the bottom surface 1124 of the insert 1116 to allow cockroaches to access bait 1162 in the bait chamber 1150, 1152 but not enter the bait chamber 1150, 1152. Each bait chamber 1150, 1152 may be filled with bait 1162 in the form of food or other pest-consumable material, a lure, or other pest-attracting materials. Bait 1162 located in the bait chambers 1150, 1152 may encourage cockroaches to enter the passage 1132 and to remain in the optimal sensing zone 922. In some embodiments, the bait 1162 may be liquid, and the partial walls 1158, 1160 may prevent the liquid bait 1162 from spreading into the optimal sensing zone 922. Of course, in some embodiments, the station 1100 may not include bait.

Figure 14:
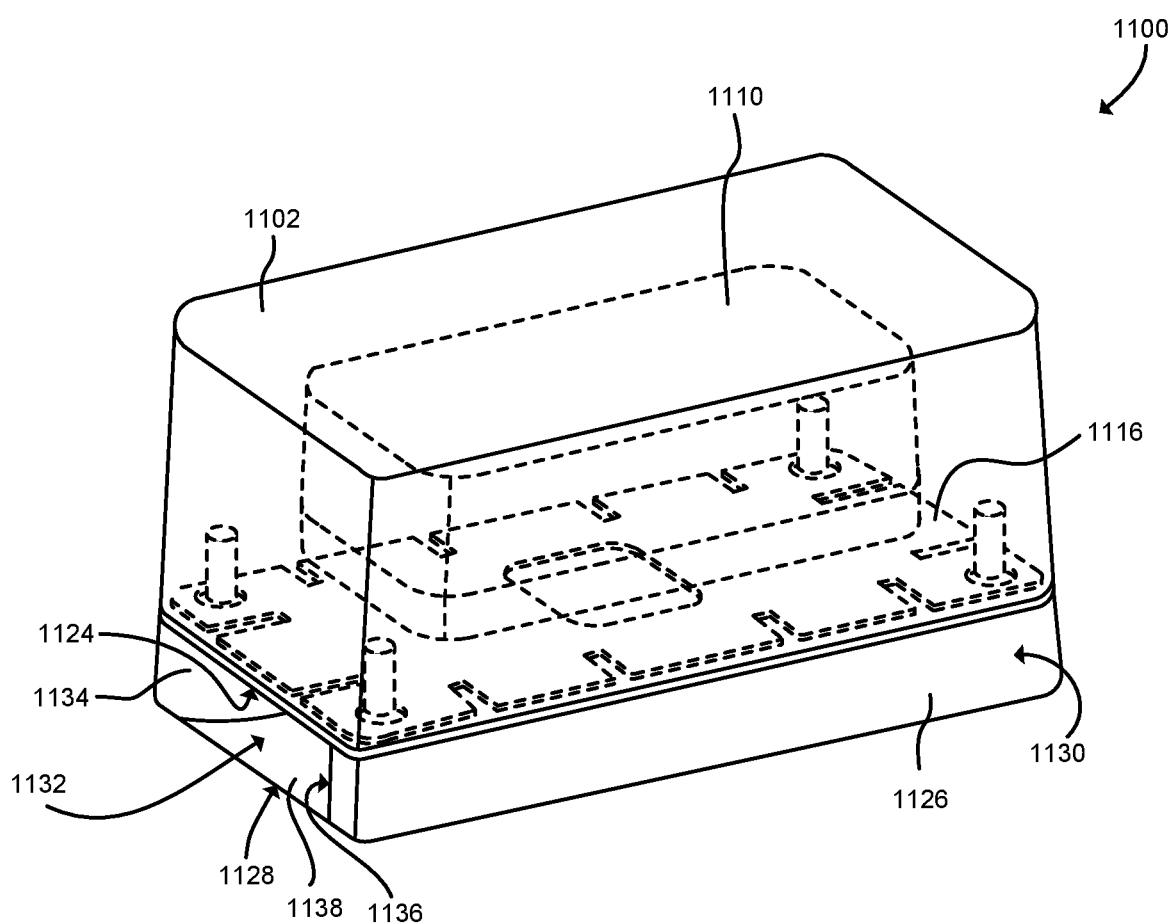
FIG. 14 is a perspective view of the pest control station of FIGS. 11-13.

The base 1126 further includes four posts 1140 that extend upward from upper surfaces 1142, 1144. Each of the upper surfaces 1142, 1144 are partially surrounded by a corresponding lip 1146, 1148. As best shown in FIG. 14, when the station 1100 is assembled, each of the posts 1140 passes through a corresponding through hole 1120 of the insert 1116 and is received by a corresponding lug 1108 of the top cover 1102. The bottom surface 1124 of the insert 1116 engages against the upper surfaces 1142, 1144 of the base 1126, and the bottom edge 1106 of the top cover 1102 engages against the lips 1146, 1148 of the base 1126. When assembled, the walls 1134, 1136, the floor 1138, and the surface 1124 cooperate to define the passage 1132.

As described above, when assembled the station 1100 prevents some or all ambient light from entering the passage 1132. Cockroaches tend to prefer dark places, and thus may be encouraged to enter the passage 1132 as it may be darker than its surroundings. Additionally, blocking ambient light may improve detection performance of the pest control device 1110. Further, the insert 1116 may prevent cockroaches from accessing the interior volume 1104 of the top cover 1102 and thus may further guide the cockroaches to the optimal sensing zone 922.

Although illustrated as including a separate top cover 1102 and insert 1116, it should be understood that in some embodiments, the station 1100 may combine some or all of the features of those components into a single component. For example, the top cover 1102 may include an integral bottom surface that cooperates with the walls 1134, 1136 and the floor 1138 of the base 1126 to define the passage 1132. As another example, the top cover 1102, the pest control device 1110, and the insert 1116 may be combined into a single component that may be coupled with the base 1126 to define the passage 1132.

Components of the station 1100 including the top cover 1102, an outer casing of the pest control device 1110, the insert 1116, and the base 1126 are illustratively formed from a hard, durable plastic and may be black or otherwise dark in color. Alternatively, in some embodiments the top cover 1102, the outer casing of the pest control device 1110, the insert 1116, and the base 1126 may be white or otherwise light in color, which may improve detection performance for certain insects. Those components may be molded, 3-D printed (i.e., additive manufacturing), or otherwise constructed. In particular, the top cover 1102, the insert 1116, and/or the base 1126 may be solid, hollow, or partially infilled in some embodiments.

Figure 15:
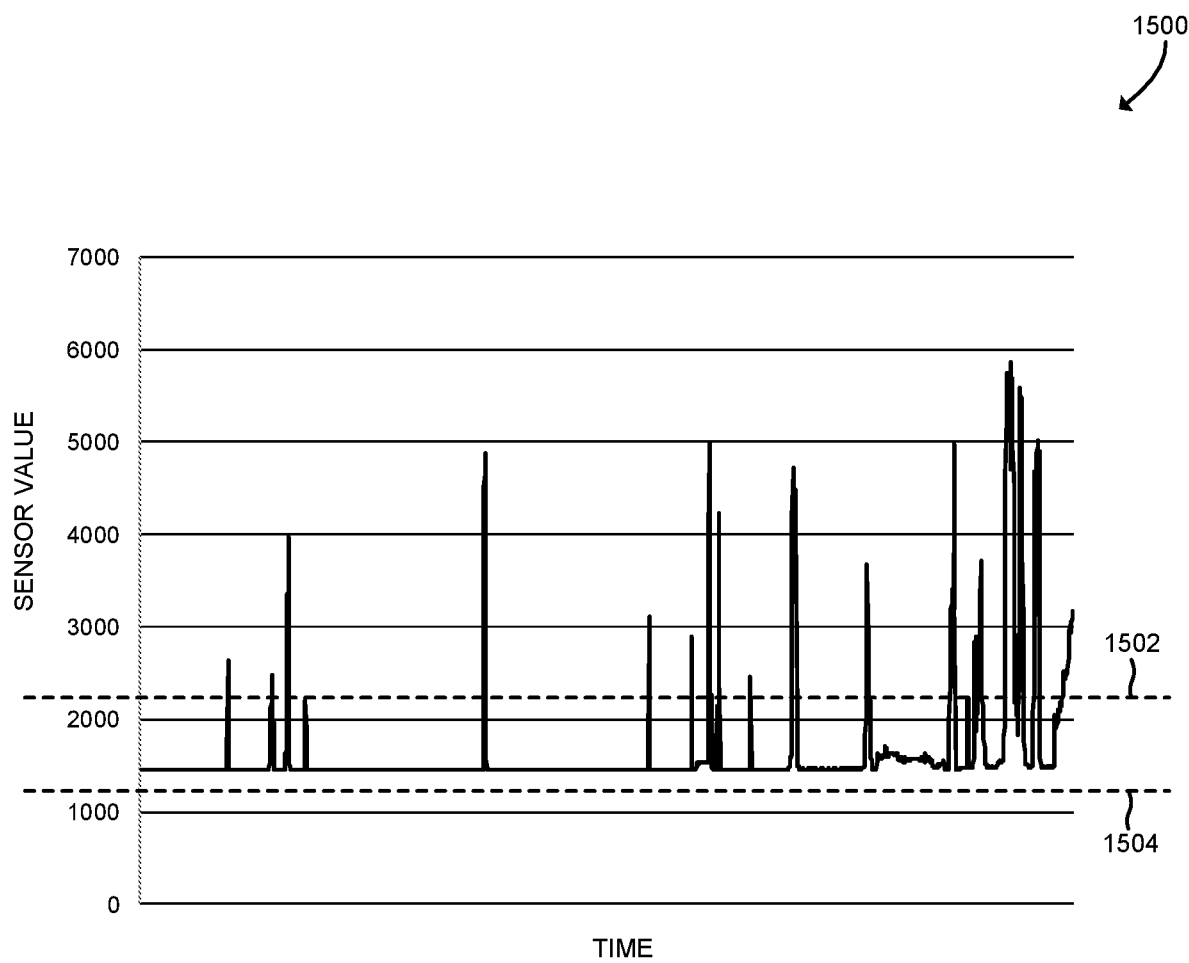
FIG. 15 is a plot illustrating test results that may be achieved by the system of FIGS. 11-14.

Referring now to FIG. 15, plot 1500 illustrates experimental results that may be achieved by the station 1100 of FIGS. 11-14. The plot 1500 displays sensor values recorded by the active infrared sensor 142 of the pest control device 1110. The sensor values may be embodied as dimensionless numeric values. As shown, the recorded sensor values include multiple peaks above the baseline that each indicate possible detection of a cockroach. Thus, the illustrative experimental results indicate that cockroaches reflect more infrared light than the interior of the station 1100 reflects when empty.

The plot 1500 also illustrates thresholds 1502, 1504. When the sensor value is greater than the threshold 1502 and/or is lower than the threshold 1504, the pest control device 1110 may generate an alert or other pest detection event. Each of the thresholds 1502, 1504 may be determined based on the baseline sensor value measured when the station 1100 is empty. For example, each of the thresholds 1502, 1504 may be 40%, 100%, or another percentage higher or lower than the baseline, respectively. In some embodiments, only a single threshold may be used. For example, in the illustrative embodiment in which cockroaches reflect more infrared light than the interior of the station 1100, the pest control device 1110 may monitor only the higher threshold 1502.

Figure 16:
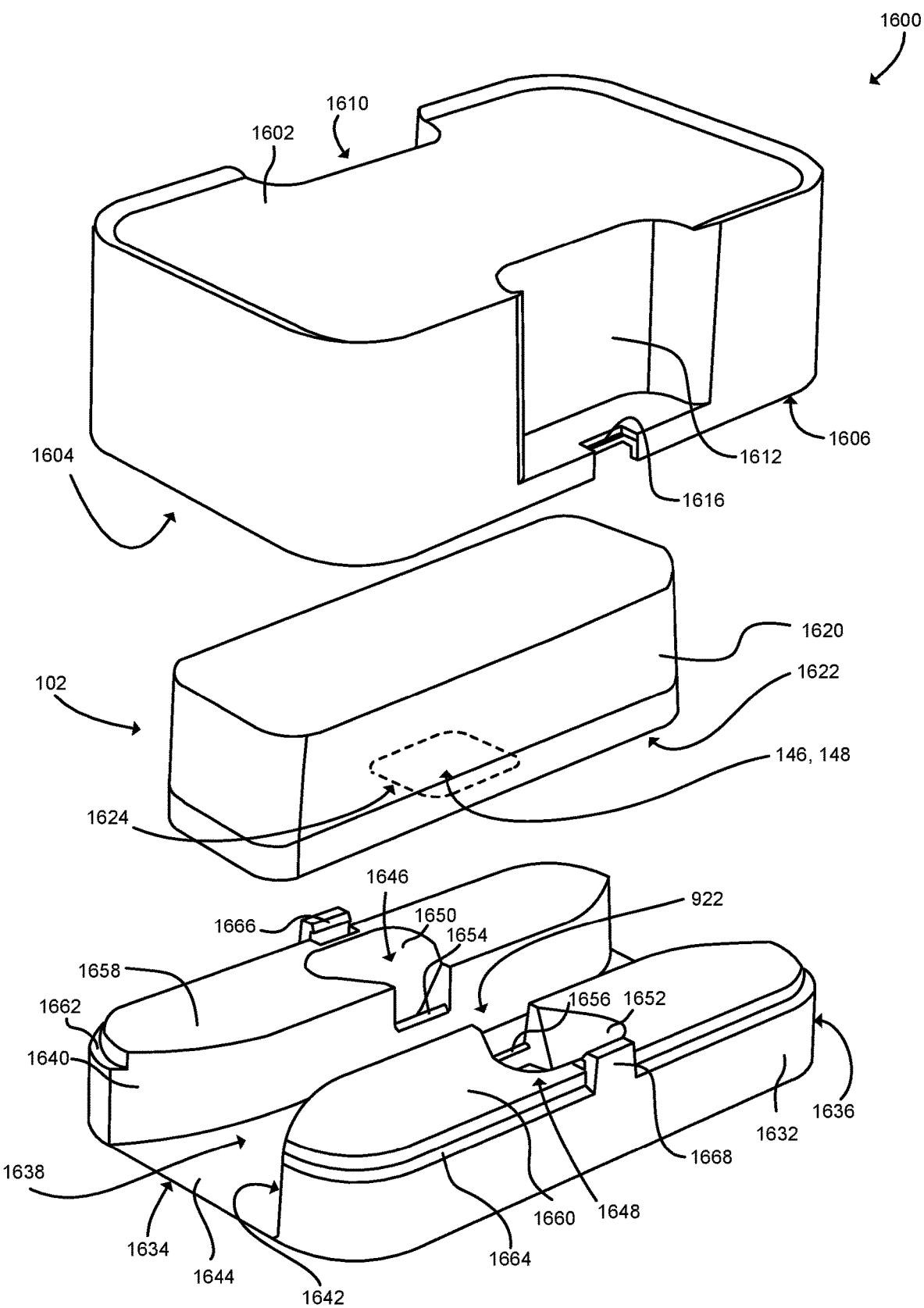
FIG. 16 is an exploded view of another embodiment of a pest control station that includes the pest control device of FIGS. 1-2.
Figure 18:
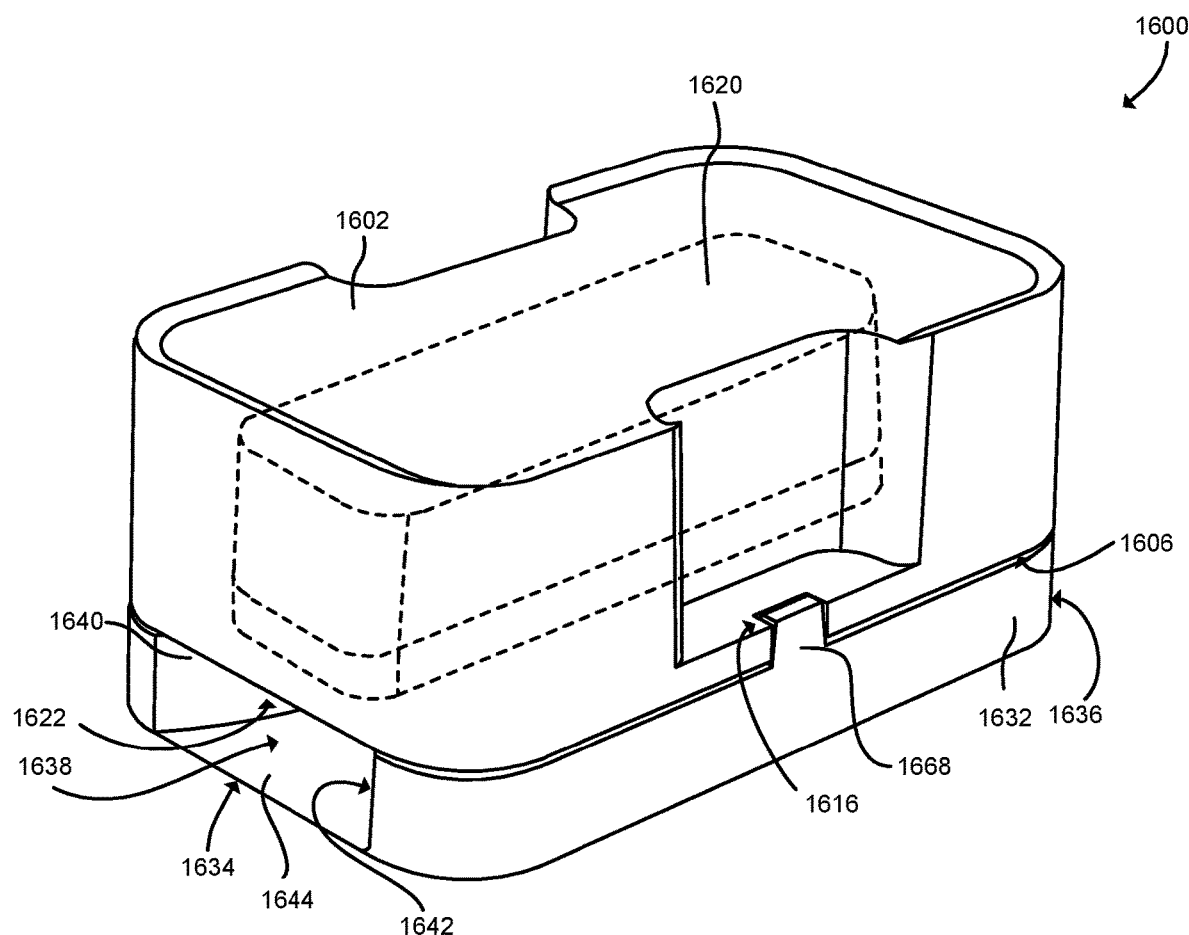
FIG. 18 is a perspective view of the pest control station of FIGS. 16-17.

Referring now to FIGS. 16-18, an embodiment of an insect control station 1600 is shown. As shown in exploded view in FIG. 16, the insect control station 1600 includes a top cover 1602, a pest control device 1620, and a base 1632. The top cover 1602 includes an interior volume 1604 surrounded by a bottom edge 1606 and an inner shoulder 1608 (best shown in FIG. 17). The interior volume 1604 is sized to receive the pest control device 1620. The sides of the top cover 1602 include recesses 1610, 1612 that cause the interior volume 1604 of the top cover 1602 to narrow and engage the outer casing of the pest control device 1620. The top cover 1602 further includes notches 1614, 1616 formed in the bottom edge 1606 and shoulder 1608. As best shown in FIG. 17, the interior volume 1604 of the top cover 1602 further includes projections 1618 that engage the outer casing of the pest control device 1620.

The pest control device 1620 may be embodied as a pest control device 102 and thus includes one or more IR LEDs 146 and photodiodes 148. The pest control device 1620 includes an outer casing that protects interior, electrical components such as the controller 120, the communication subsystem 128, and the active IR sensor 142. The casing is illustratively formed from a plastic material that protects the electrical components from environmental factors, including water ingress, dust, dirt, leaves, humidity, and waste. The illustrative pest control device 1620 includes an internal antenna 130 within the casing that allows for communication with the remote system 104. As described above, the pest control device 1620 is received in the interior volume 1604 of the top cover 1602. As discussed above, the outer casing of the pest control device 1620 may engage the recesses 1610, 1612 and the projections 1618 of the top cover 1602 inside the interior volume 1604.

As shown, the pest control device 1620 includes a bottom surface 1622. The bottom surface 1622 includes window 1624, which may be embodied as transparent plastic or other material that is transparent to IR light and in some embodiments visible light. As best shown in FIG. 17, the IR LEDs 146 and the photodiodes 148 are positioned within the pest control device 1620 behind the window 1624, allowing access to the environment surrounding the pest control device 1620. In the illustrative embodiment, the pest control device 1620 includes three IR LEDs 146 that are positioned in a triangular pattern behind the window 1624. In some embodiments, the pest control device 1620 may activate only one of the IR LEDs 146 in order to reduce power consumption. As best shown in FIG. 17, the window 1624 may be recessed within the bottom surface 1622 by a beveled surround 1626. Similarly, the bottom surface 1622 may be recessed by a beveled surround 1628 from an outer edge 1630 of the pest control device 1620.

The base 1632 includes a pair of openings 1634, 1636 on either end of the base 1632. The openings 1634, 1636 are in communication with a passage 1638 that extends through the interior of the base 1632. When assembled, each of the openings 1634, 1636 are defined by side walls 1640, 1642 and a floor 1644 of the base 1632, as well as the bottom surface 1622 of the pest control device 1620. The walls 1640, 1642 and/or floor 1644 may be angled and/or curved such that each of the openings 1634, 1636 narrow into the passage 1638. In use, as described further below, insects such as cockroaches may crawl into the passage 1638 through either of the openings 1634, 1636. In some embodiments, the floor 1644 may be flat and/or may form a ramp to allow cockroaches to enter the passage 1638.

As discussed above in connection with FIGS. 9-10, the passage 1638 has a height that is defined between the floor 1644 and the surface 1622 within the passage 1638 as well as a width that is defined between the walls 1640, 1642 within the passage 1638. In the illustrative station 1600, the height and the width are each about 17 millimeters, which may allow detection of American cockroaches and/or German cockroaches.

When assembled, the pest control device 1620 is positioned above the optimal sensing zone 922 of the passage 1638. As described above, the IR LEDs 146 of the pest control device 1620 are configured to illuminate the interior of the passage 1638 through the window 1624 of the pest control device 1620. As described above, the pest control device 1620 illuminates the passage 1638 with the IR LEDs 146 and measures the IR response signature with the photodiodes 148. As described above, changes in the IR signature may indicate that a cockroach has entered the passage 1638. The pest control device 1620 may report the presence of insects in the passage 1638 to the remote system 104 via the antenna 130. The pest control device 1620 may perform best for detecting insects that are located within the optimal sensing zone 922.

The illustrative optimal sensing zone 922 extends between the walls 1640, 1642 of the passage 1638. Cockroaches, as well as many other insects and other types of animals, tend to prefer to follow along walls when entering a space. Thus, by narrowing the openings 1634, 1636 into the passage 1638, the walls 1640, 1642 may guide cockroaches into the optimal sensing zone 922. Similarly, when assembled the floor 1644 may raise toward the surface 1622 to guide cockroaches into the optimal sensing zone 922.

As best shown in FIG. 16, the base 1632 includes a pair of bait chambers 1646, 1648 positioned adjacent to the optimal sensing zone 922 of the passage 1638. Each bait chamber 1646, 1648 is defined by a respective internal wall 1650, 1652 and is separated from the passage 1638 by a respective partial wall 1654, 1656. When assembled, each partial wall 1654, 1656 cooperates with the bottom surface 1622 of the pest control device 1620 to allow cockroaches to access bait in the bait chamber 1646, 1648 but not enter the bait chamber 1646, 1648. Each bait chamber 1646, 1648 may be filled with bait in the form of food or other pest-consumable material, a lure, or other pest-attracting materials. Bait located in the bait chambers 1646, 1648 may encourage cockroaches to enter the passage 1638 and to remain in the optimal sensing zone 922. In some embodiments, the bait may be liquid, and the partial walls 1654, 1656 may prevent the liquid bait from spreading into the optimal sensing zone 922. Of course, in some embodiments, the station 1600 may not include bait.

The base 1632 further includes upper surfaces 1658, 1660 that are each partially surrounded by a corresponding lip 1662, 1664. The base 1632 further includes tabs 1666, 1668 that extend upward from the lips 1662, 1664, respectively. As best shown in FIG. 18, when the station 1600 is assembled, each of the tabs 1666, 1668 engages a corresponding notch 1614, 1616 of the top cover 1602 and thus holds the station 1600 together securely. When assembled, the bottom surface 1622 of the pest control device 1620 engages against the upper surfaces 1658, 1660 of the base 1632, and the bottom edge 1606 of the top cover 1602 engages against the lips 1662, 1664 of the base 1632. When assembled, the walls 1640, 1642, the floor 1644, and the surface 1622 cooperate to define the passage 1638.

As described above, when assembled the station 1600 prevents some or all ambient light from entering the passage 1638. Cockroaches tend to prefer dark places, and thus may be encouraged to enter the passage 1638 as it may be darker than its surroundings. Additionally, blocking ambient light may improve detection performance of the pest control device 1620. Further, in the illustrative embodiment of FIGS. 16-18, the bottom surface 1622 of the pest control device 1620 may completely cover the passage 1638 and thus may prevent cockroaches from exiting the passage 1638 and accessing the interior volume 1604 of the top cover 1602.

Components of the station 1600 including the top cover 1602, an outer casing of the pest control device 1620, and the base 1632 are illustratively formed from a hard, durable plastic and may be black or otherwise dark in color. Alternatively, in some embodiments the top cover 1602, the outer casing of the pest control device 1620, and the base 1632 may be white or otherwise light in color, which may improve detection performance for certain insects. Those components may be molded, 3-D printed (i.e., additive manufacturing), or otherwise constructed. In particular, the top cover 1602 and/or the base 1632 may be solid, hollow, or partially infilled in some embodiments.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A pest control device comprising:
   an active infrared sensor;
   a controller;
   a pest detection module configured to:
   determine, by the active infrared sensor, an active infrared signature for a monitored space;
   determine, by the active infrared sensor, whether the active infrared signature is outside a predetermined window in relation to a predetermined baseline signature; and
   activate, by the active infrared sensor, the controller of the pest control device in response to a determination that the active infrared signature is outside the predetermined window; and
   a response module configured to perform, by the controller, a pest control action in response to activation of the controller.

2. The pest control device of claim 1, wherein to determine the active infrared signature comprises to:
   measure an ambient infrared light value with a photodetector of the pest control device;
   activate an infrared emitter of the pest control device;
   measure a pulse infrared light value with the photodetector in response to activating the infrared emitter; and
   determine the active infrared signature as a difference between the pulse infrared light value and the ambient infrared light value.

3. The pest control device of claim 2, wherein:
   to activate the infrared emitter comprises to activate a plurality of infrared light emitting diodes in a time series, wherein the plurality of light emitting diodes are positioned apart from each other; and
   to measure the pulse infrared light value comprises to measure a time series of infrared light values with one or more photodiodes.

4. The pest control device of claim 3, further comprising a spatial module to construct, by the controller, a three-dimensional representation of a monitored space as a function of the time series of infrared light values.

5. The pest control device of claim 1, wherein to determine whether the active infrared signal is outside the predetermined window comprises to determine whether the active infrared signal has a first predetermined relationship with a high threshold value or a second predetermined relationship with a low threshold value.

6. The pest control device of claim 1, wherein to activate the controller comprises to:
   assert, by the active infrared sensor, an interrupt to the controller, and
   wake, by the controller, from a low power state to an active state in response to assertion of the interrupt.

7. The pest control device of claim 1, wherein to perform the pest control action comprises to send a notification to a remote device via a wireless communication.

8. The pest control device of claim 1, wherein:
   to determine whether the active infrared signature is outside the predetermined window comprises to determine whether the active infrared signature is outside the predetermined window for more than a predetermined debounce interval; and
   to activate the controller comprises to activate the controller in response to a determination that the active infrared signature is outside the predetermined window for more than the predetermined debounce interval.

9. The pest control device of claim 1, further comprising a calibration module configured to:
   calibrate, by the controller, an infrared emitter of the active infrared sensor based on an environment of the pest control device;
   wherein to determine the active infrared signature comprises to determine the active infrared signature in response to calibration of the infrared emitter.

10. The pest control device of claim 9, wherein to calibrate the infrared emitter comprises to:
activate the infrared emitter;
measure a pulse infrared light value with a photodetector of the pest control device in response to activation of the infrared emitter;
compare the pulse infrared light value to a predetermined threshold; and
adjust an intensity of the infrared emitter in response to a comparison of the pulse infrared light value to the predetermined threshold.

11. The pest control device of claim 10, wherein to calibrate the infrared emitter comprises to periodically calibrate the infrared emitter.

12. The pest control device of claim 1, further comprising an adaptive baseline module configured to:
determine, by the active infrared sensor, the predetermined baseline signature for the monitored space;
wherein to determine the active infrared signature comprises to determine the active infrared signature in response to a determination of the predetermined baseline signature.

13. The pest control device of claim 12, wherein the adaptive baseline module is further configured to adapt, by the controller, the predetermined baseline signature based on a previous baseline signature.

14. The pest control device of claim 1, wherein the pest control device is included in a chamber of a pest station, wherein the chamber is sized to receive a rodent, and wherein the monitored space is included in the chamber.

15. One or more non-transitory computer-readable storage media comprising a plurality of instructions stored thereon that, in response to being executed, cause a pest control device to:
determine, by an active infrared sensor of the pest control device, an active infrared signature for a monitored space;
determine, by the active infrared sensor, whether the active infrared signature is outside a predetermined window in relation to a predetermined baseline signature;
activate a controller of the pest control device in response to determining that the active infrared signature is outside the predetermined window; and
perform, by the controller, a pest control action in response to activating the controller.

16. The one or more computer-readable storage media of claim 15, wherein to determine the active infrared signature comprises to:
measure an ambient infrared light value with a photodetector of the pest control device;
activate an infrared emitter of the pest control device;
measure a pulse infrared light value with the photodetector in response to activating the infrared emitter; and
determine the active infrared signature as a difference between the pulse infrared light value and the ambient infrared light value.

17. The one or more computer-readable storage media of claim 15, wherein to perform the pest control action comprises to send a notification to a remote device via a wireless communication.

18. The one or more computer-readable storage media of claim 15, wherein:
to determine whether the active infrared signature is outside the predetermined window comprises to determine whether the active infrared signature is outside the predetermined window for more than a predetermined debounce interval; and
to activate the controller comprises to activate the controller in response to determining that the active infrared signature is outside the predetermined window for more than the predetermined debounce interval.

19. The one or more computer-readable storage media of claim 15, further comprising a plurality of instructions stored thereon that, in response to being executed, cause the pest control device to:
calibrate, by the controller, an infrared emitter of the active infrared sensor based on an environment of the pest control device;
wherein to determine the active infrared signature comprises to determine the active infrared signature in response to calibrating the infrared emitter.

20. The one or more computer-readable storage media of claim 15, further comprising a plurality of instructions stored thereon that, in response to being executed, cause the pest control device to:
determine, by the active infrared sensor, the predetermined baseline signature for the monitored space;
wherein to determine the active infrared signature comprises to determine the active infrared signature in response to determining the predetermined baseline signature.

* * * * *